United States Patent
Kim et al.

(10) Patent No.: US 11,681,389 B2
(45) Date of Patent: Jun. 20, 2023

(54) TOUCH SENSOR AND DISPLAY DEVICE

(71) Applicant: Samsung Display Co., Ltd., Yongin-si (KR)

(72) Inventors: Do Ik Kim, Suwon-si (KR); Jang-Hui Kim, Suwon-si (KR); Ga Young Kim, Hwaseong-si (KR); A Ra Jo, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 256 days.

(21) Appl. No.: 16/809,061

(22) Filed: Mar. 4, 2020

(65) Prior Publication Data

US 2020/0285339 A1    Sep. 10, 2020

(30) Foreign Application Priority Data

Mar. 5, 2019 (KR) .................. 10-2019-0025257

(51) Int. Cl.
  *G06F 3/00* (2006.01)
  *G06F 3/041* (2006.01)
  *G06F 3/044* (2006.01)
  *G06F 1/16* (2006.01)

(52) U.S. Cl.
  CPC .......... *G06F 3/0414* (2013.01); *G06F 1/1626* (2013.01); *G06F 3/0412* (2013.01); *G06F 3/0418* (2013.01); *G06F 3/0446* (2019.05); *G06F 2203/04106* (2013.01)

(58) Field of Classification Search
  CPC .... G06F 3/0414; G06F 3/0412; G06F 3/0446; G06F 3/0418; G06F 1/1626; G06F 2203/04106
  See application file for complete search history.

(56) References Cited

U.S. PATENT DOCUMENTS

| 10,579,181 | B2 | 3/2020 | Lee et al. | |
| 2010/0117975 | A1* | 5/2010 | Cho | G06F 1/1626 345/173 |
| 2013/0222306 | A1* | 8/2013 | Aberg | G06F 3/0416 345/173 |
| 2014/0204285 | A1* | 7/2014 | Jang | G06F 3/0412 349/12 |
| 2015/0220181 | A1* | 8/2015 | Jung | G06F 3/0446 345/174 |
| 2016/0048243 | A1* | 2/2016 | Bulea | G06F 3/044 345/174 |
| 2016/0124573 | A1* | 5/2016 | Rouaissia | G06F 3/044 345/174 |

(Continued)

FOREIGN PATENT DOCUMENTS

| EP | 3719618 | 10/2020 |
| KR | 10-2017-0096476 | 8/2017 |

(Continued)

*Primary Examiner* — Michael A Faragalla
(74) *Attorney, Agent, or Firm* — H.C. Park & Associates, PLC

(57) ABSTRACT

A touch sensor and a display device, in which the touch sensor includes: a base layer including a first region which is a flat portion, and a second region which is a curved portion extending from the first region; touch electrodes arranged on the base layer and each including an opening; a strain gauge disposed in the first region; and a temperature compensation pattern disposed in the second region.

12 Claims, 31 Drawing Sheets

(56) References Cited

U.S. PATENT DOCUMENTS

| | | | | |
|---|---|---|---|---|
| 2016/0195955 A1* | 7/2016 | Picciotto | ............. | G06F 3/04144 |
| | | | | 345/174 |
| 2016/0299629 A1* | 10/2016 | Doyle | ................... | H01L 27/323 |
| 2017/0075465 A1* | 3/2017 | Pedder | ................... | G06F 3/0414 |
| 2017/0285803 A1* | 10/2017 | Lee | ....................... | G06F 3/0412 |
| 2018/0090498 A1* | 3/2018 | Onuki | ................... | G11C 11/404 |
| 2018/0348926 A1* | 12/2018 | Su | ....................... | H01L 51/0023 |
| 2019/0079666 A1* | 3/2019 | Li | ......................... | G06F 3/0482 |
| 2020/0319735 A1 | 10/2020 | Kim et al. | | |

FOREIGN PATENT DOCUMENTS

| | | |
|---|---|---|
| KR | 10-2018-0087527 | 2/2018 |
| KR | 10-1935810 | 1/2019 |
| KR | 10-2020-0117084 | 10/2020 |

\* cited by examiner

TOUCH SENSOR AND DISPLAY DEVICE

This application claims priority from and the benefit of Korean Patent Application No. 10-2019-0025257 filed on Mar. 5, 2019, which is incorporated by reference for all purposes as if fully set forth herein.

BACKGROUND

Field

Exemplary embodiments of the invention relate generally to a touch sensor as well as a display device incorporating the touch sensor.

Discussion of the Background

A display device for displaying an image is used for various electronic appliances for providing an image to a user, such as smart phones, tablet PCs, digital cameras, notebook computers, navigators, and televisions. The display device includes a display panel for generating and displaying an image and various input devices.

Recently, in the fields of smart phones and tablet PCs, a touch sensor recognizing a touch input has been widely applied to a display device. The touch sensor has a trend to replace the existing physical input device such as a keypad because of the convenience of touching.

Research has been conducted to utilize a pressure sensor for detecting the intensity of pressure as a substitute for a physical button by applying the pressure sensor to a display device, in addition to the touch sensor for detecting a touch position.

The above information disclosed in this Background section is only for understanding of the background of the inventive concepts, and, therefore, it may contain information that does not constitute prior art.

SUMMARY

Devices constructed according to exemplary embodiments of the invention are capable of providing a touch sensor capable of sensing pressure more precisely through temperature compensation.

Additional features of the inventive concepts will be set forth in the description which follows, and in part will be apparent from the description, or may be learned by practice of the inventive concepts.

According to an exemplary embodiment of the present invention, there is provided a touch sensor. The touch sensor includes: a base layer including a first region which is a flat portion, and a second region which is a curved portion extending from the first region; touch electrodes arranged on the base layer and each including an opening; a strain gauge disposed in the first region; and a temperature compensation pattern disposed in the second region.

The touch electrodes may include first touch electrodes arranged along a first direction and second touch electrodes arranged along a second direction crossing the first direction, and the opening may include a first opening disposed in each of the first touch electrodes and a second opening disposed in each of the second touch electrodes.

The strain gauge may include first resistance lines, and the first resistance lines may be located in the second opening located in the first region.

The temperature compensation pattern may include second resistance lines, and the second resistance lines may be located in the first opening located in the second region.

The strain gauge may further include a first connection line electrically connecting the first resistance lines in the first direction.

The strain gauge may further include a first connection pattern electrically connecting the first resistance lines electrically connected in the first direction through the first connection line and located in a first row with the first resistance lines electrically connected in the first direction through the first connection line and located in a second row in a second direction.

The temperature compensation pattern may further include a second connection line electrically connecting the second resistance lines in the first direction.

The temperature compensation pattern may further include a second connection pattern electrically connecting the second resistance lines electrically connected in the first direction through the second connection line and located in a first electrode row with the second resistance lines electrically connected in the first direction through the second connection line and located in a second electrode row in a second direction.

The first touch electrodes, the second touch electrodes, the first resistance lines, and the second resistance lines may be arranged on the same first layer, and the first touch electrodes, the second touch electrodes, the first resistance lines, and the second resistance lines may be made of the same material.

An insulating layer may be located on the base layer, wherein the first connection line, the first connection pattern, the second connection line, and the second connection pattern are located on the base layer, the insulating layer is located on the first connection line, the first connection pattern, the second connection line, and the second connection pattern, and the first touch electrodes, the second touch electrodes, the first resistance lines, and the second resistance lines are located on the insulating layer.

A first connection portion may electrically connect the first touch electrodes in the first direction; and a second connection portion may electrically connect the second touch electrodes in the second direction, wherein the first connection portion is located between the base layer and the insulating layer, and the second connection portion is located on the insulating layer.

A touch control unit may be connected to the first touch electrodes, the second touch electrodes, the strain gauge, and the temperature compensation pattern, wherein the touch control unit is configured to detect a position of a touch input based on a change in capacitance between the first touch electrodes and the second touch electrodes, the change being generated in response to the touch input, to detect a pressure of the touch input based on a change in resistance value of the strain gauge, the change being generated in response to the touch input, and to compensate a component duet to a temperature change in the change in resistance value of the strain gauge based on a resistance value of the temperature compensation pattern.

A Wheatstone Bridge circuit may be electrically connected to the strain gauge and the temperature compensation pattern.

According to another exemplary embodiment of the present invention, there is provided a touch sensor that includes a base layer including a first region which is a flat portion, a second region which is a curved portion extending from the first region, and a third region which is a side region extending from the second region; touch electrodes arranged on the base layer and each including an opening; a strain gauge disposed in each of the first region and the third region; and a temperature compensation pattern disposed in the second region, wherein the third region is a plane perpendicular to the first region.

The touch electrodes may include first touch electrodes arranged along a first direction and second touch electrodes arranged along a second direction crossing the first direction, and the opening may include a first opening disposed in each of the first touch electrodes and a second opening disposed in each of the second touch electrodes.

The strain gauge may include first resistance lines, and the first resistance lines are located in the second opening located in the first region and the third region.

The temperature compensation pattern may include second resistance lines, and the second resistance lines are located in the first opening located in the second region.

A dummy electrode may be located in the first opening located in the first region and the third region and the second opening may be located in the second region.

According to yet another exemplary embodiment of the present invention, there is provided a display device. The display device includes: a base substrate including a first region which is a flat portion, and a second region which is a curved portion extending from the first region; a light emitting element located on the base substrate; a thin film encapsulation layer located on the light emitting element; touch electrodes located on the thin film encapsulation layer and including an opening; a strain gauge disposed on the thin film encapsulation layer and located in the first region; and a temperature compensation pattern disposed on the thin film encapsulation layer and located in the second region.

The thin film encapsulation layer may include a first encapsulation inorganic film located on the light emitting element, an encapsulation organic film located on the first encapsulation inorganic film, and a second encapsulation inorganic film may be located on the encapsulation organic film, and the touch electrodes, the strain gauge, and the temperature compensation pattern may be located on the second encapsulation inorganic film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

Figure 1:
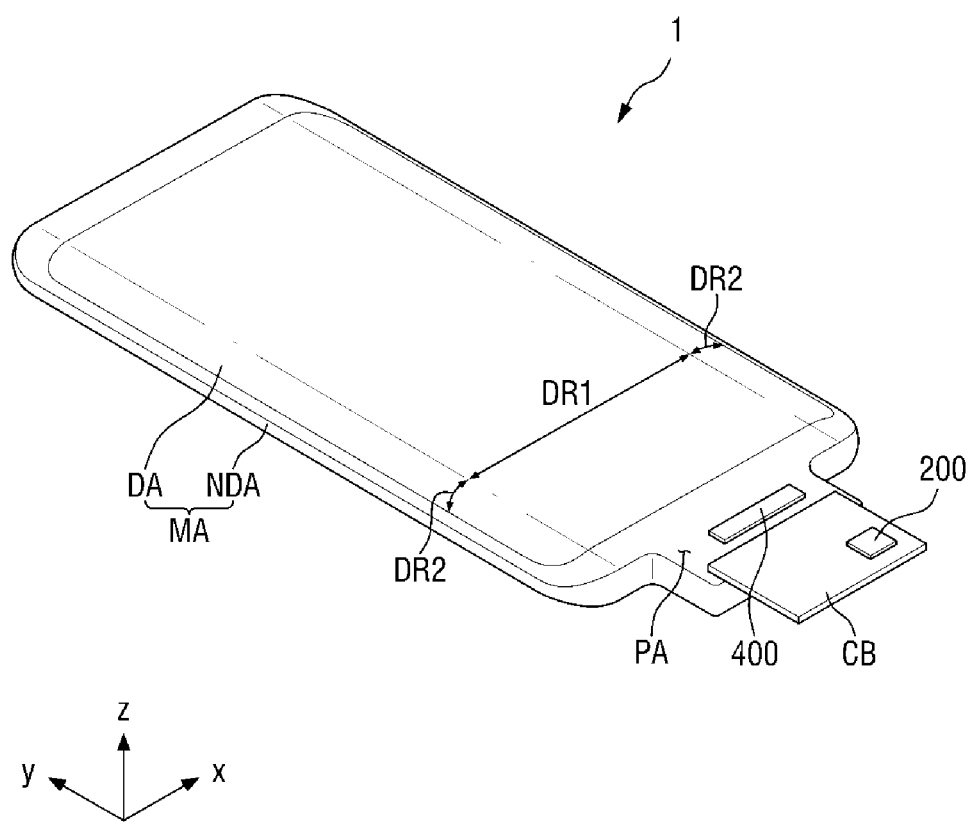
FIG. 1 is a schematic perspective view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the present invention will be described with reference to the attached drawings.

Figure 2:
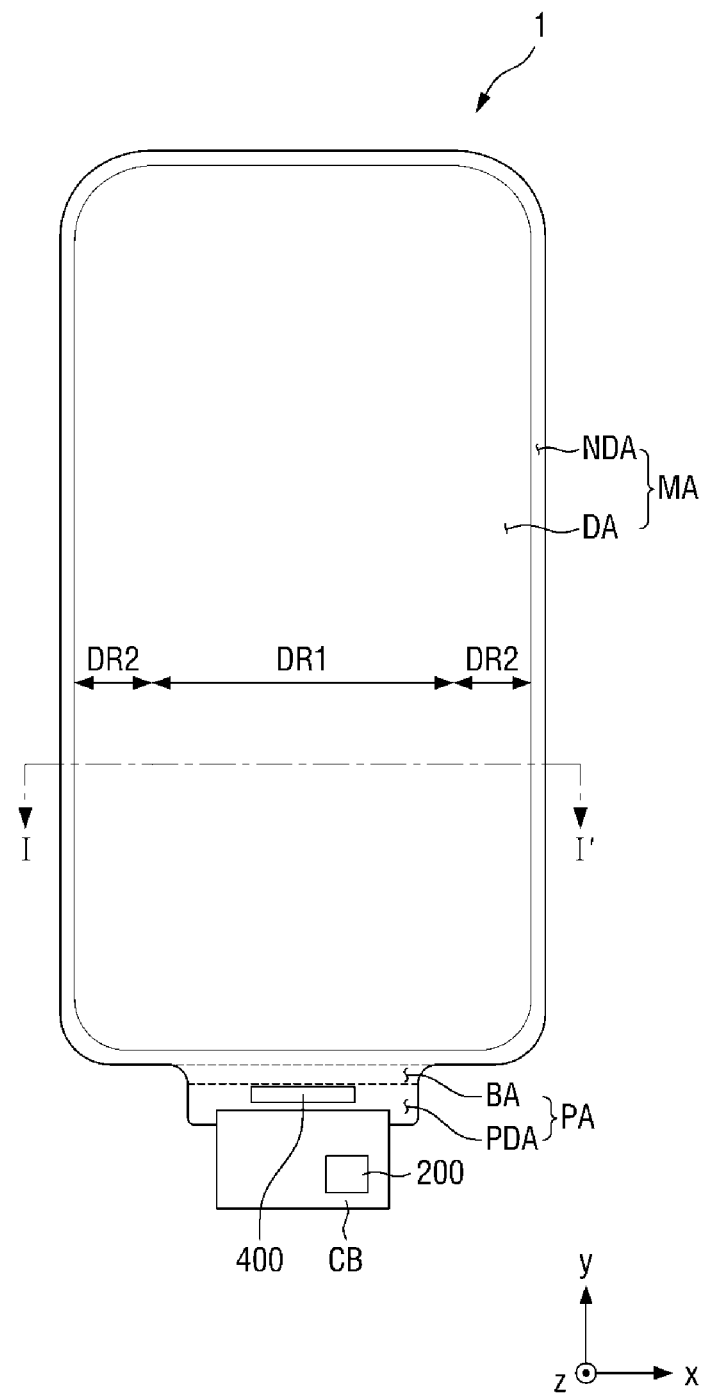
FIG. 2 is a plan view of a display device according to an exemplary embodiment.
Figure 3:
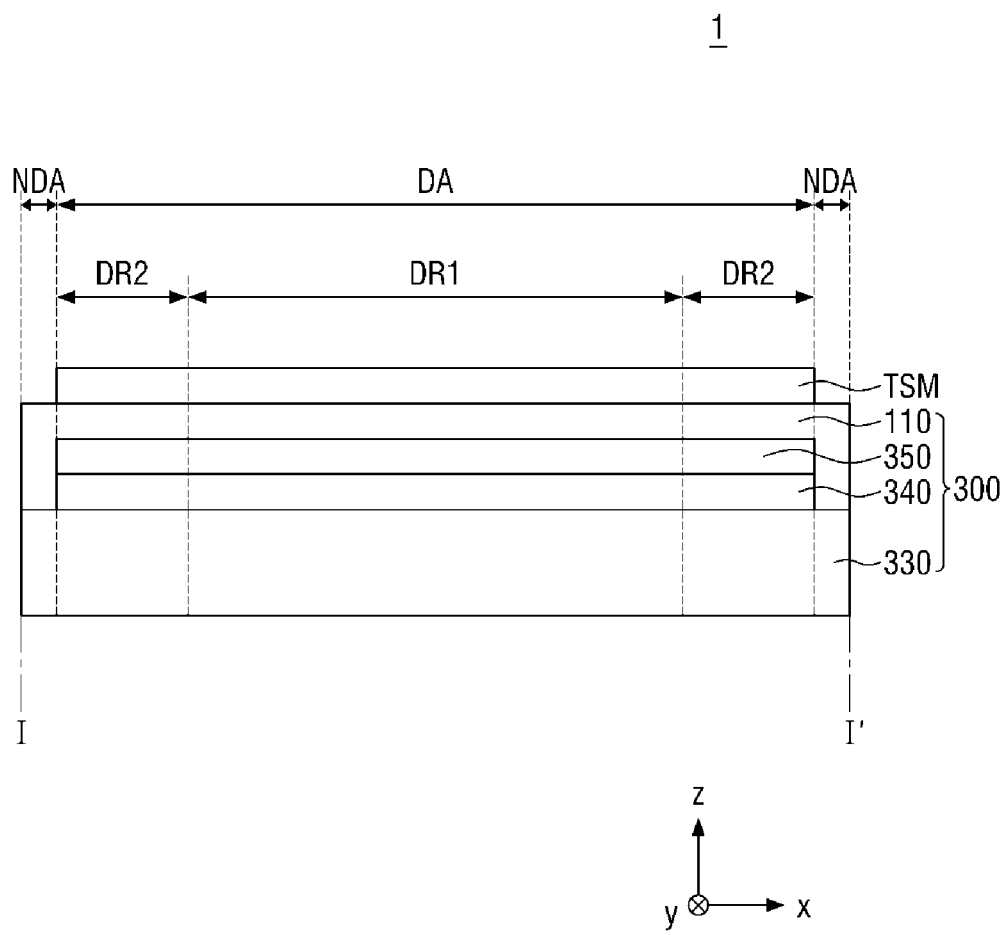
FIG. 3 is a cross-sectional view taken along the line I-I' of FIG. 2.
Figure 4:
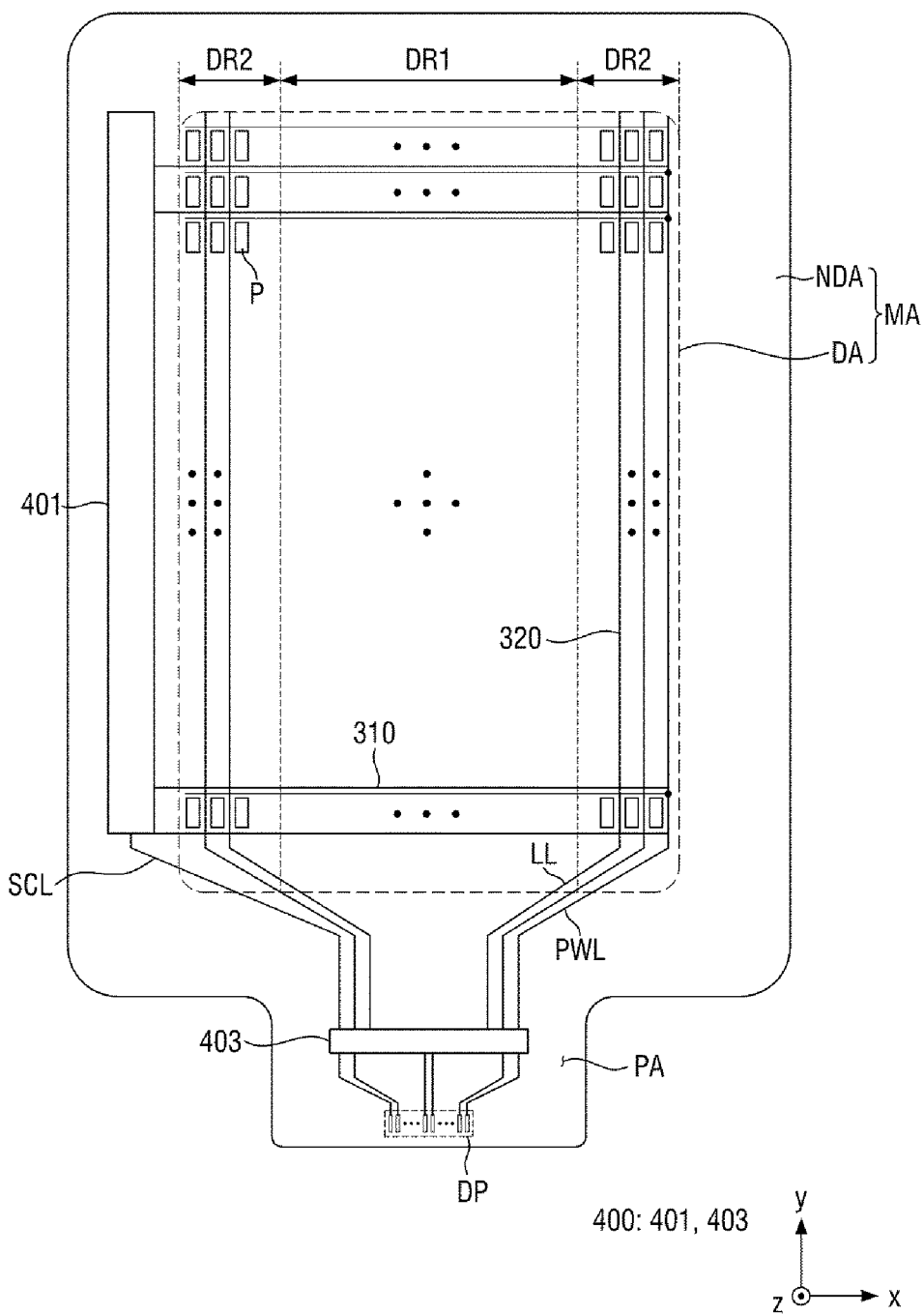
FIG. 4 is an exemplary view specifically showing an example of the display unit of FIG. 3.

FIG. 1 is a schematic perspective view of a display device according to an exemplary embodiment, FIG. 2 is a plan view of a display device according to an exemplary embodiment, FIG. 3 is a cross-sectional view taken along the line I-I' of FIG. 2, and FIG. 4 is an exemplary view specifically showing an example of the display unit of FIG. 3.

As used herein, the "on", "over", "top", "upper side", or "upper surface" refers to an upward direction, that is, a Z-axis direction, with respect to the display device 1, and the "beneath", "under", "bottom", "lower side", or "lower surface" refers to a downward direction, that is, a direction opposite to the Z-axis direction, with respect to the display device 1. Further, the "left", "right", "upper", and "lower" refer to directions when the display device 1 is viewed from the plane. For example, the "left" refers to a direction opposite to the X-axis direction, the "right" refers to the X-axis direction, the "upper" refers to the Y-axis direction, and the "lower" refers to a direction opposite to the Y-axis direction.

Referring to FIGS. 1 to 4, a display device 1, which is a device for displaying a moving image or a still image, may be used as a display screen of various products such as televisions, notebooks, monitors, billboards, internet of things (IOTs) as well as portable electronic appliances such as mobile phones, smart phones, tablet personal computers (tablet PCs), smart watches, watch phones, mobile communication terminals, electronic notebooks, electronic books, portable multimedia players (PMPs), navigators, and ultra mobile PCs (UMPCs). The display device 1 may be any one of an organic light emitting display, a liquid crystal display, a plasma display, a field emission display, an electrophoretic display, an electrowetting display, a quantum dot light emitting display, and micro LED display. Hereinafter, the display device 1 will be mainly described as an organic light emitting display device, but the present invention is not limited thereto.

The display device 1 may have a rectangular shape in a plan view. For example, the display device 1 may have a rectangular planar shape having short sides in the first direction (X-axis direction) and long sides in the second direction (Y-axis direction). The edge where the short side in the first direction (X-axis direction) meets the long side in the second direction (Y-axis direction) may be formed to have a round shape of a predetermined curvature or have a right angle shape. The planar shape of the display device 1 is not limited to a rectangular shape, and may be formed in another polygonal shape, circular shape, or elliptical shape.

The display device 1 may include a first region DR1 formed flat and a second region DR2 extending from the right and left sides of the first region DR1. The second region DR2 may be formed to be curved, and the second region DR2 may have a constant curvature or a variable curvature.

Although it is shown in FIG. 1 that the second region DR2 extends from the left and right sides of the first region DR1, the present invention is not limited thereto. That is, the second region DR2 may extend from only one of the left and right sides of the first region DR1. In addition, the second region DR2 may extend from only one of the upper and lower sides of the first region DR1 as well as only one of the left and right sides of the first region DR1. Hereinafter, it is assumed that the second region DR2 is disposed along the left and right edges of the display device 1.

In some exemplary embodiments, the display device 1 may include a display panel 300, a display panel driver 400, a circuit board CB, and a touch control unit 200.

Referring to FIGS. 2 to 4, the display panel 300 may include a main area MA and a protrusion area PA protruding from one side of the main area MA.

The main area MA may include a first region DR1 formed flat and a second region DR2 extending from the right and left sides of the first region DR1. The main area MA may include a display area DA where pixels are formed to display an image, and a non-display area NDA which is a peripheral area of the display area DA.

The display area DA may be provided with scan lines 310, data lines 320, and power supply lines PWL, which are connected to pixels, in addition to the pixels. The display area DA may be provided with the first region DR1, which is a flat portion, and the second region DR2, which is a curved portion, extending from the left and right sides of the first region DR1. Accordingly, an image of the display panel 300 may be seen even in the second region DR2 which is a curved portion.

The non-display area NDA may be defined as an area from the outside of the display area DA to the edge of the display panel 300. The non-display area NDA may be provided with a scan driver 401 for applying scan signals to the scan lines 310 and link lines LL for connecting the data lines 320 to a display drive circuit 403. The scan driver 401 and the display drive circuit 403 may constitute a display panel driver 400.

The protrusion area PA may protrude from one side of the main area MA. For example, the protrusion area PA may protrude from the lower side of the main area MA in a direction opposite to the second direction (Y-axis direction) as shown in FIG. 2. The length of the protrusion area PA in the first direction (X-axis direction) may be smaller than the length of the main area MA in the first direction (X-axis direction).

The protrusion area PA may include a bending area BA and a pad area PDA. In this case, the pad area PDA may be disposed at one side of the bending area BA, and the main area MA may be disposed at the other side of the bending area BA. For example, the pad area PDA may be disposed at the lower side the bending area BA, and the main area MA may be disposed at the upper side of the bending area BA.

The display panel 300 may be formed to be flexible so as to be bent, warped, folded or rolled. Therefore, the display panel 300 may be bent in a thickness direction (Z-axis direction) in the bending area BA. In this case, one side of the pad area PDA of the display panel 300 faces upward before the display panel 300 is bent, but faces downward after the display panel 300 is bent. Thus, the pad area PDA is disposed under the main area MA to overlap the main area MA. However, the present invention is not limited thereto, and the display panel 300 may be provided without the bending area BA. In this case, one side of the pad area PDA of the display panel 300 faces upward.

A pad portion electrically connected to the display drive circuit 403 and the circuit board CB may be disposed in the pad area PDA of the display panel 300.

The display drive circuit 403 outputs signals and voltages for driving the display panel 300. For example, the display drive circuit 403 may supply data voltages to the data lines 320. Further, the display drive circuit 403 may supply a power supply voltage to the power supply lines PWL, and may supply scan control signals to the scan driver 401. The display drive circuit 403 may be formed as an integrated circuit (IC), and may be mounted on the pad area PDA of the display panel 300 by a chip on glass (COG) bonding method, a chip on plastic (COP) bonding method, or an ultrasonic bonding method, but the present invention is not limited thereto. For example, the display drive circuit 403 may be mounted on the circuit board CB.

Figure 5:
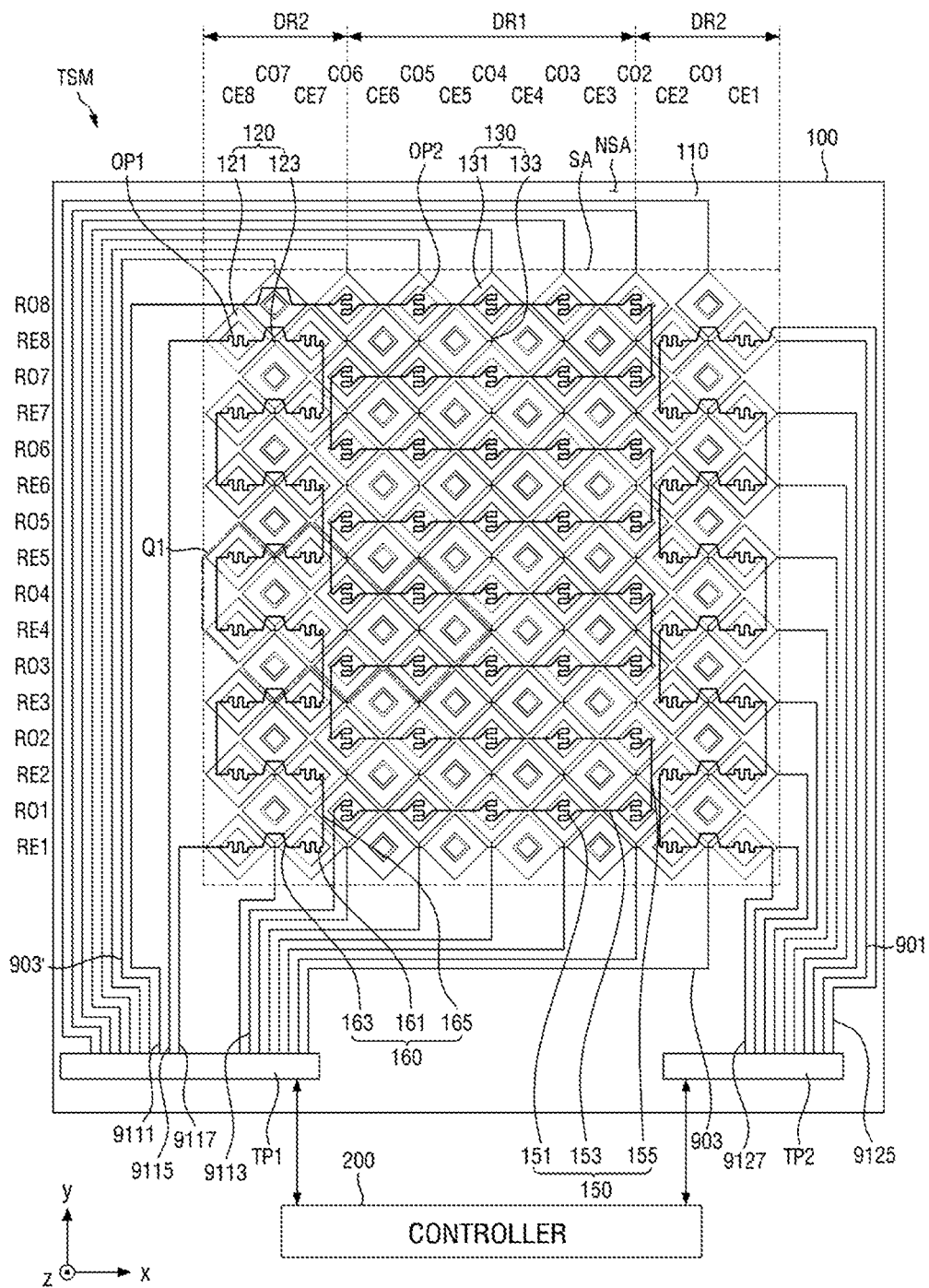
FIG. 5 is a view showing the touch sensor of FIG. 3, in which a plan view of a sensor unit of the touch sensor and a connection relationship between the sensor unit and the control unit are shown.

The pad portion may include a display pad DP electrically connected to the display drive circuit 403 as shown in FIG. 4 and touch pads TP1 and TP2 electrically connected to signal lines 9111, 9113, 9115, 9117, 9125, and 9127 arranged in a touch sensor TSM as shown in FIG. 5.

The circuit board CB may be attached onto the pad area PDA using an anisotropic conductive film. Thus, the lead lines of the circuit board CB may be electrically connected to the pads DP, TP1 and TP2. The circuit board CB may be a flexible printed circuit board, a printed circuit board, or a flexible film such as a chip on film (COF).

As shown in FIG. 5, the touch control unit 200 may be electrically connected to a sensor unit 100 to supply a driving signal to the sensor unit 100, and may receive a sensing signal corresponding to the driving signal from the sensor unit 100 to detect a touch position. The touch control unit 200 may be disposed on the circuit board CB. The touch control unit 200 may be formed as an integrated circuit (IC) and mounted on the circuit board CB. Details of the sensor unit 100 and the touch control unit 200 will be described later with reference to FIGS. 5 and 6.

Referring to FIG. 3, the display device 1 may include a display panel 300 including a base substrate 330, a thin film transistor layer 340 disposed on the base substrate 330, a light emitting element layer 350, and a thin film encapsulation layer 110; and a touch sensor TSM disposed on the display panel 300.

The base substrate 330 may be made of an insulating material such as glass, quartz, or a polymer resin. Examples of the polymer resin may include polyethersulphone (PES), polyacrylate (PA), polyarylate (PAR), polyetherimide (PEI), polyethylenenapthalate (PEN), polyethylene terepthalate (PET), polyphenylenesulfide (PPS), polyallylate, polyimide (PI), polycarbonate (PC), cellulosetriacetate (CAT), cellulose acetate propionate (CAP), and combinations thereof. Alternatively, the base substrate 330 may include a metal material.

The base substrate 330 may be a rigid substrate, or may be a flexible substrate capable of bending, folding, rolling, or the like. When the base substrate 330 is a flexible substrate, the base substrate 330 may be made of polyimide (PI), but the present invention is not limited thereto.

The thin film transistor layer 340 may be disposed on the base substrate 330. The thin film transistor layer 340 may be provided with scan lines 310, data lines 320, power supply lines PWL, scan control lines SCL, and link lines LL for connecting a display pad DP and the data lines 320 as well as thin film transistors of respective pixels P. Each of the thin film transistors may include a gate electrode, a semiconductor layer, a source electrode, and a drain electrode. When the scan driver 401 is formed in the non-display area NDA of the display panel 300 as shown in FIG. 4, the scan driver 401 may include thin film transistors.

The thin film transistor layer 340 may be disposed in the display area DA and the non-display area NDA. Specifically, the thin film transistors of respective pixels P, the scan lines 310, the data lines 320, and the power supply lines PWL may be arranged in the first region DR1 and second region DR2 of the display area DA. The scan control lines SCL and link lines LL of the thin film transistor layer (TFTL) 340 may be arranged in the non-display area NDA.

The light emitting element layer 350 may be disposed on the thin film transistor layer 340. The light emitting element layer 350 may include pixels p including a first electrode, a light emitting layer, and a second electrode, and a pixel defining layer defining the pixels P. The light emitting layer may be an organic light emitting layer including an organic material.

When a predetermined voltage is applied to the first electrode through the thin film transistor of the thin film transistor layer 340 and a cathode voltage is applied to the second electrode through the thin film transistor of the thin film transistor layer 340, holes and electrons move to an organic light emitting layer through a hole transporting layer and an electron transporting layer, respectively, and are combined with each other in the organic light emitting layer to emit light. The pixels of the light emitting element layer 350 may be arranged in the display area DA.

The thin film encapsulation layer 110 may be disposed on the light emitting element layer 350. The thin film encapsulation layer 110 serves to prevent or reduce oxygen or moisture from penetrating the light emitting element layer 350.

The thin film encapsulation layer 110 may be disposed in both the display area DA and the non-display area NDA. Specifically, the thin film encapsulation layer 110 may be disposed to cover the light emitting element layer 350 of the display area DA and the non-display area NDA and cover the thin film transistor layer 340 of the non-display area NDA.

The touch sensor TSM may be disposed on a base layer in the form of the thin film encapsulation layer 110. When the touch sensor TSM is disposed directly on the thin film encapsulation layer 110, there is an advantage of reducing the thickness of the display device 1, compared to when a separate touch panel including the touch sensor TSM is attached onto the thin film encapsulation layer 110.

The sensor unit 100 of the touch sensor TSM may include a sensing area SA overlapping the display area DA and a peripheral area NSA overlapping the non-display area NDA as shown in FIG. 5. The sensing area SA may include a first region DR1, which is a flat portion, and a second region DR2, which is a curved portion extending from the left and right sides of the first region DR. The signal lines 9111, 9113, 9115, 9117, 9125, and 9127 of the touch sensor TSM may be arranged in the peripheral area NSA.

Although not shown in the drawing, a cover window may be further disposed on the touch sensor TSM, and, in this case, the cover window may be attached to the touch sensor TSM by a transparent adhesive member such as an optically clear adhesive (OCA) film.

Figure 6:
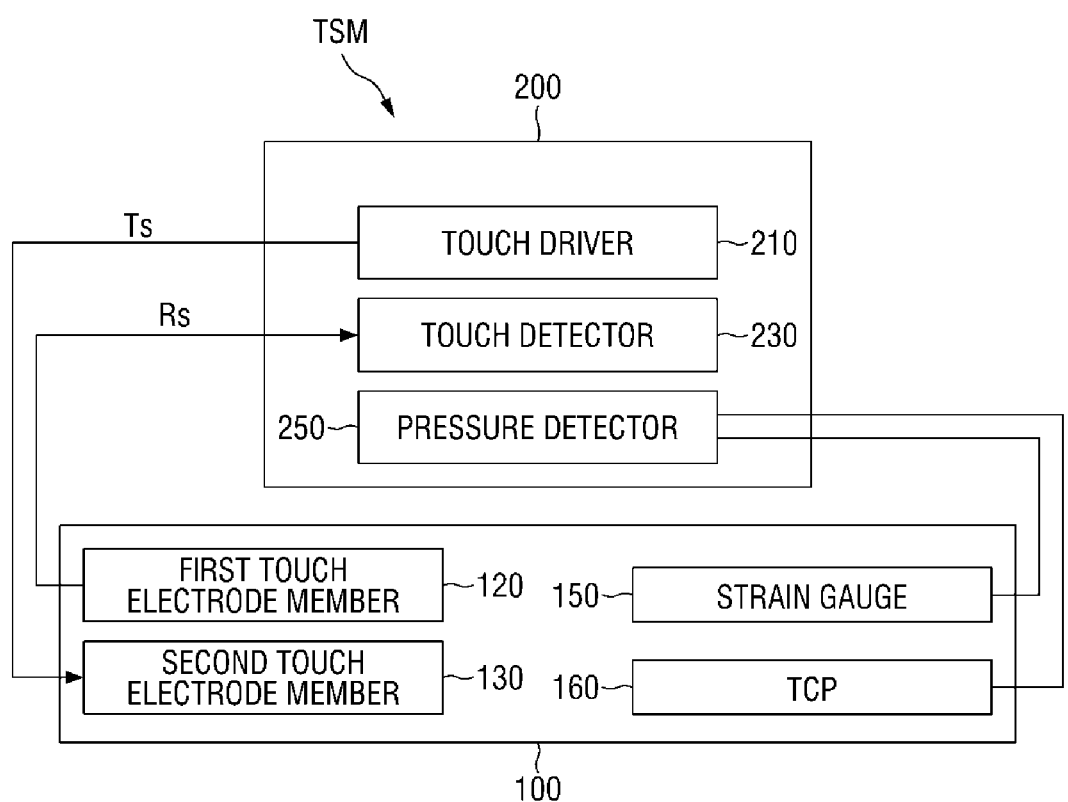
FIG. 6 is a block diagram of the touch sensor of FIG. 3.
Figure 7:
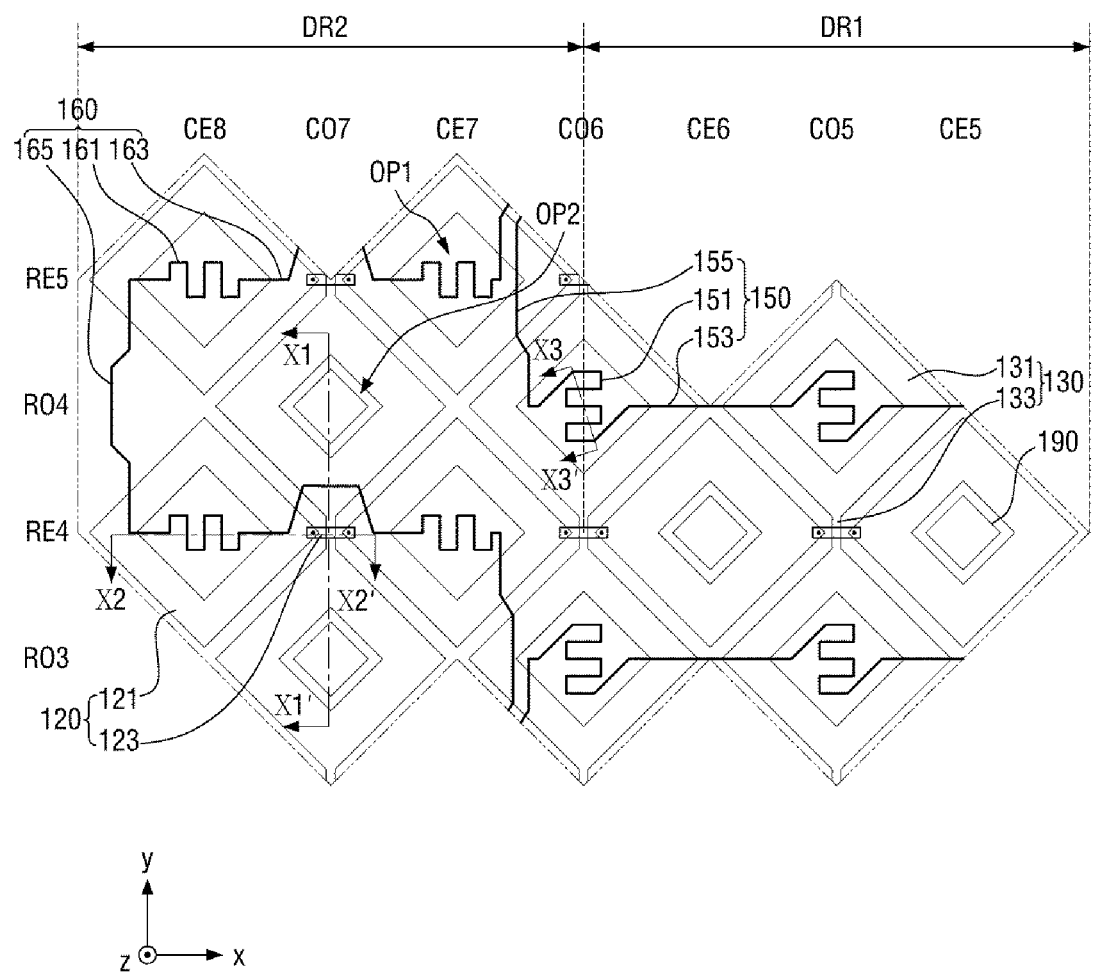
FIG. 7 is an enlarged plan view of the portion Q1 of FIG. 5.
Figure 8:
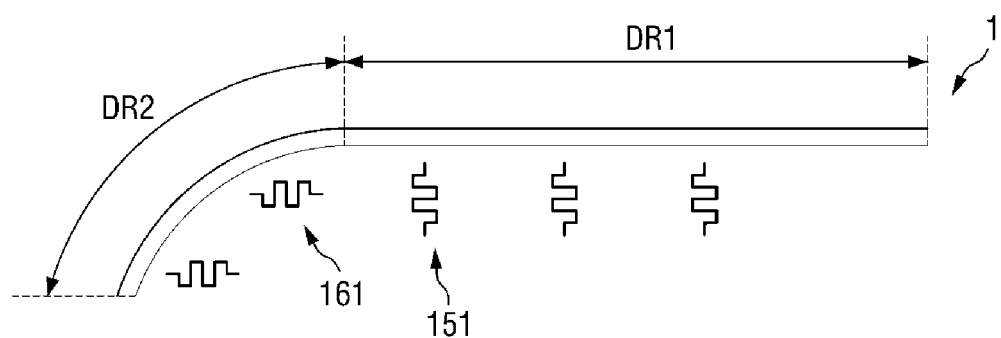
FIG. 8 is a view for explaining the arrangement of a strain gauge and a temperature compensation pattern in the display device according to an exemplary embodiment.
Figure 9:
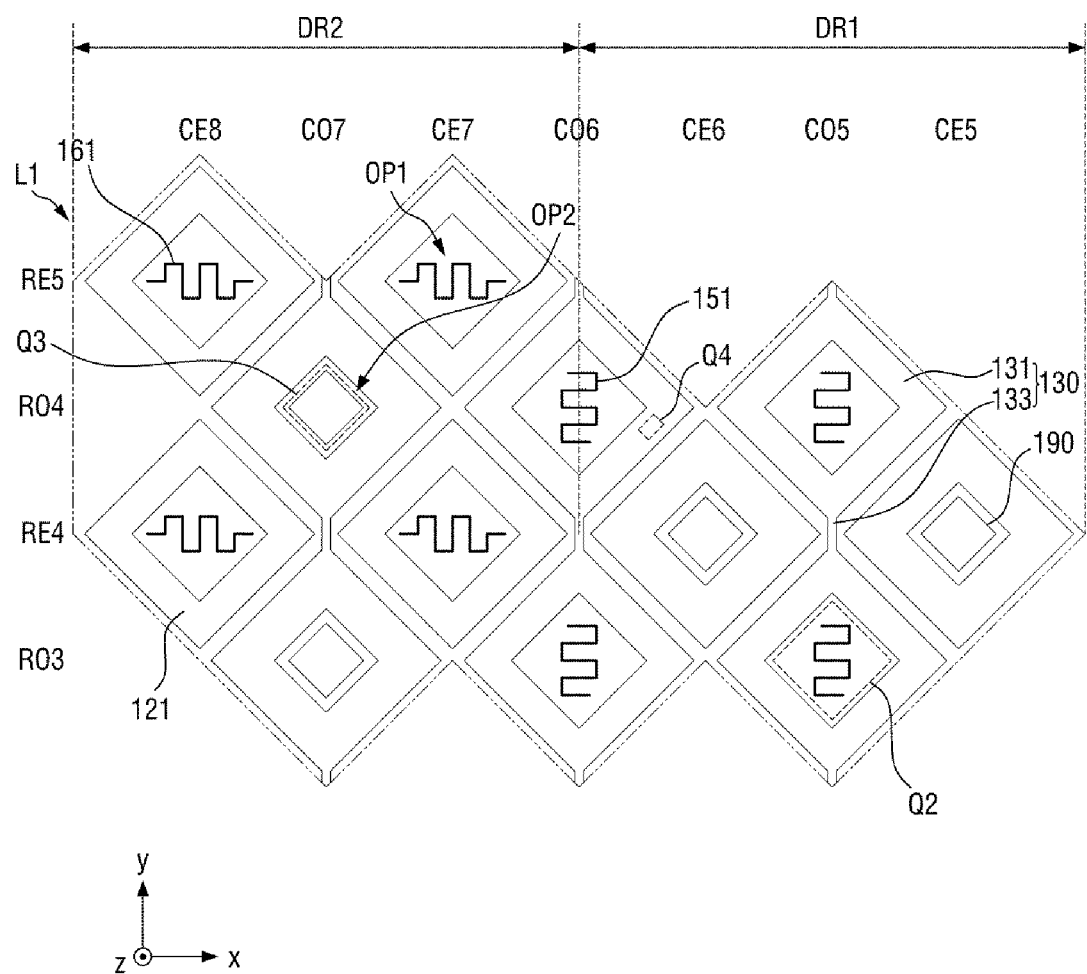
FIG. 9 is a view showing the structure of a first layer of the sensor unit shown in FIG. 7.
Figure 10:
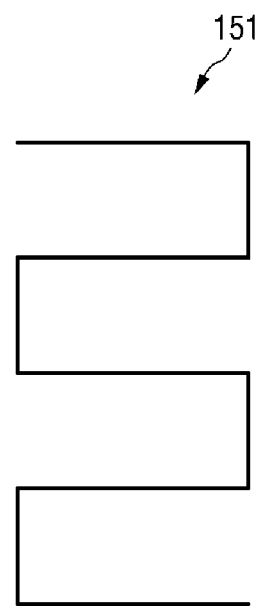
FIG. 10 is an enlarged plan view of the portion Q2 of FIG. 9.
Figure 11:
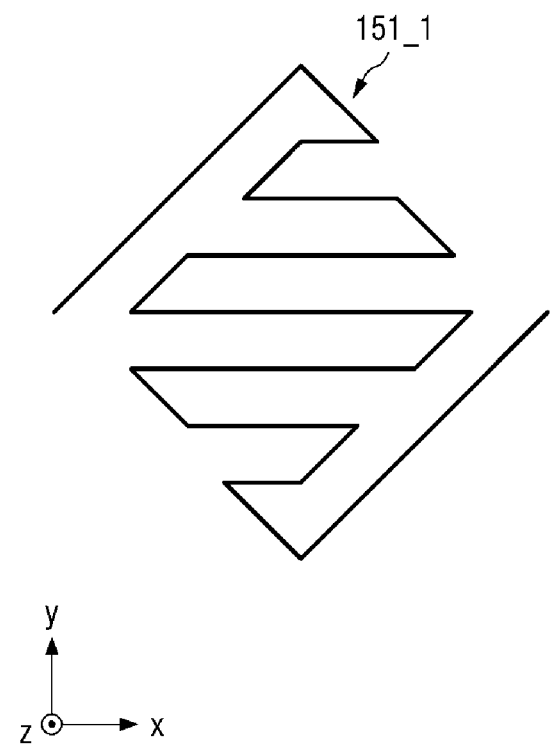
FIG. 11 is a view showing another exemplary embodiment of the resistance line shown in FIG. 10.
Figure 12:
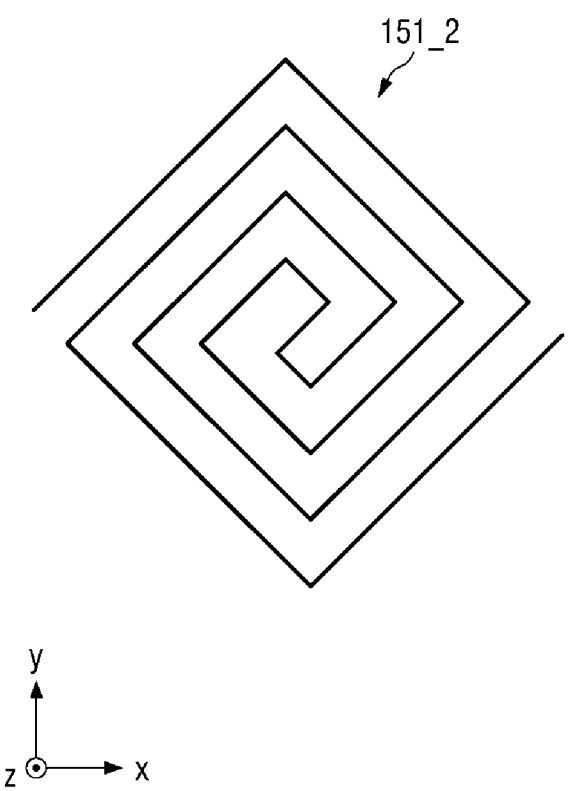
FIG. 12 is a view showing another exemplary embodiment of the resistance line shown in FIG. 10.
Figure 13:
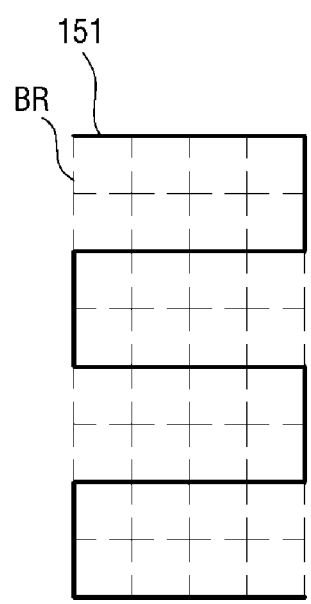
FIG. 13 is a view showing another exemplary embodiment of the resistance line shown in FIG. 10.
Figure 13:
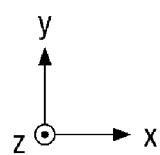
Figure 14:
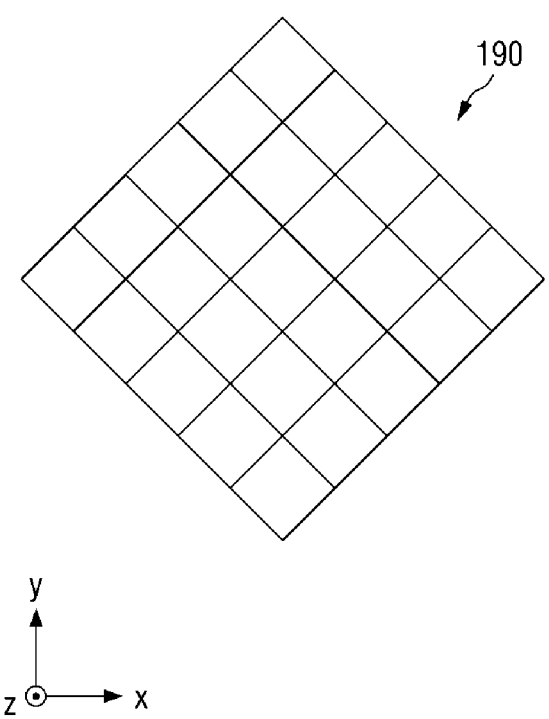
FIG. 14 is an enlarged plan view of the portion Q3 of FIG. 9.
Figure 15:
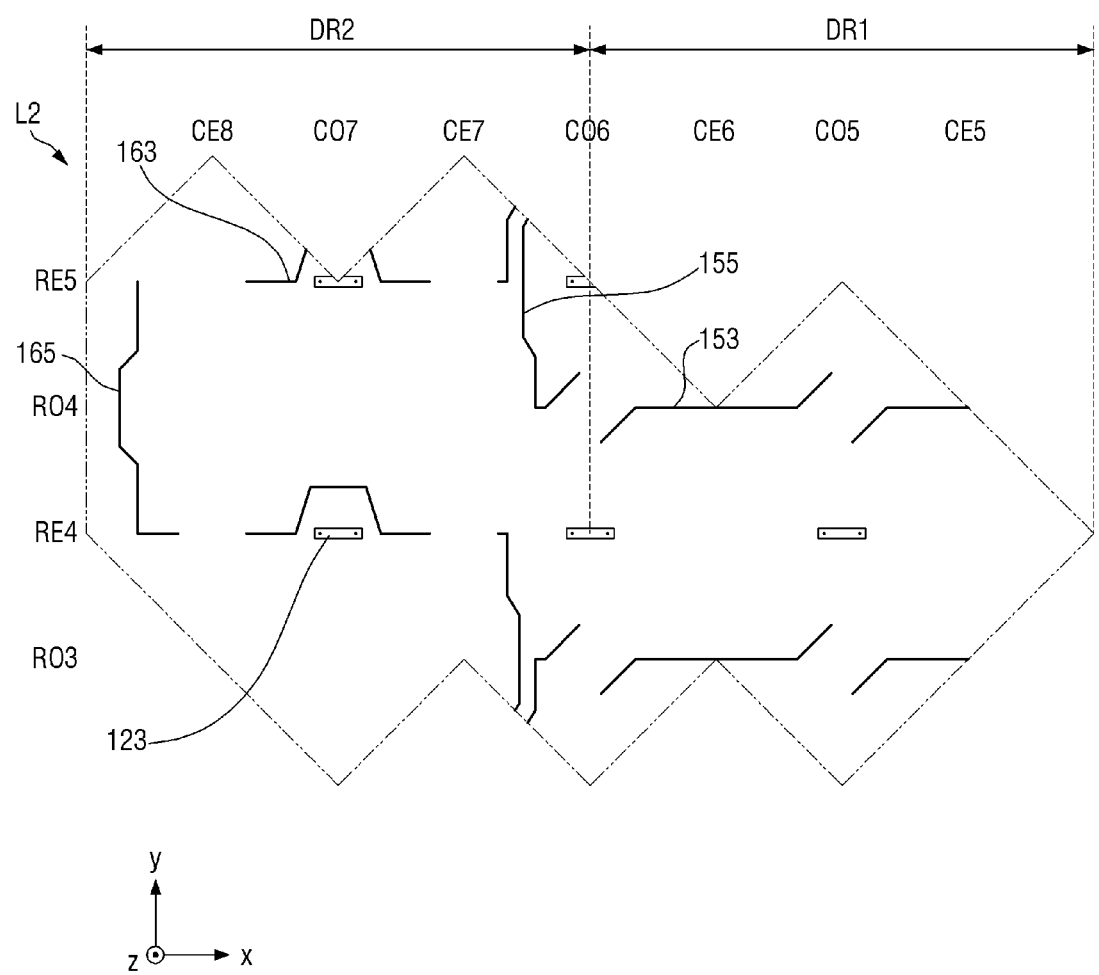
FIG. 15 is a view showing the structure of a second layer of the sensor unit shown in FIG. 7.
Figure 16:
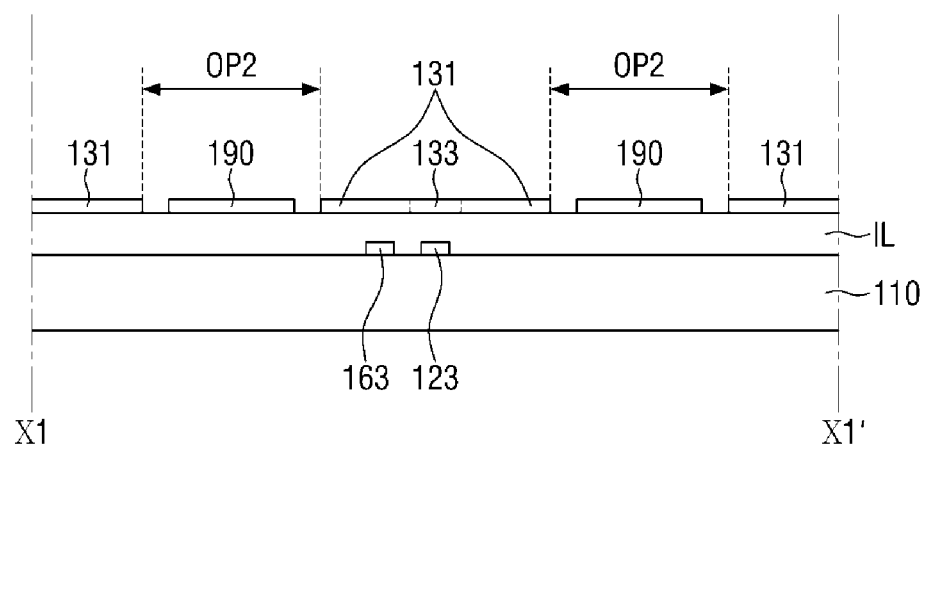
FIG. 16 is a cross-sectional view taken along the line X1-X1' of FIG. 7.
Figure 17:
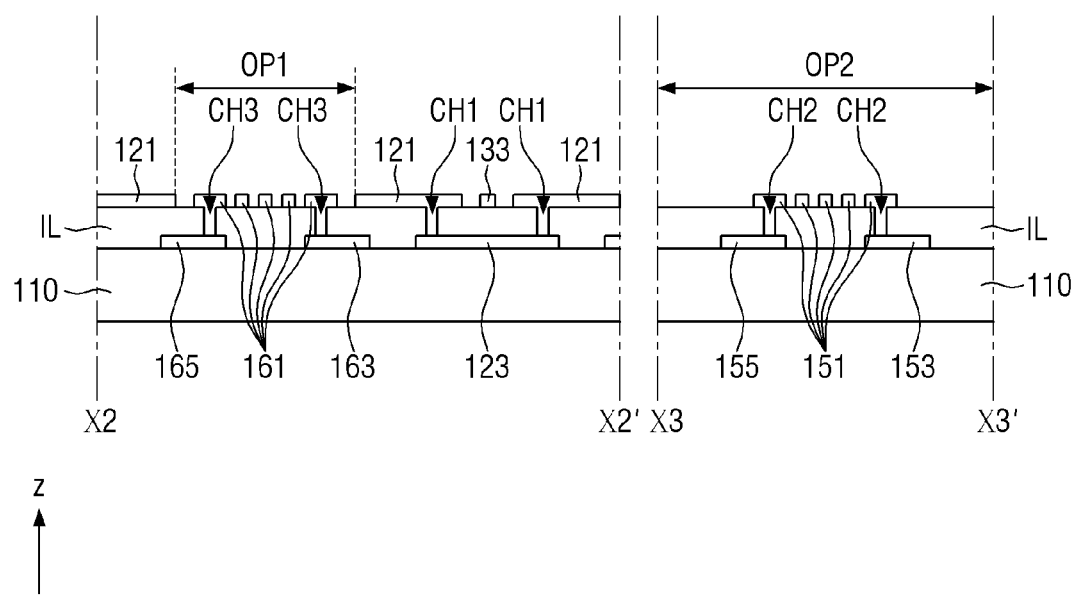
FIG. 17 is a cross-sectional view taken along the lines X2-X2' and X3-X3' of FIG. 7.

FIG. 5 is a view showing the touch sensor of FIG. 3, in which a plan view of a sensor unit of the touch sensor and a connection relationship between the sensor unit and the control unit are shown, FIG. 6 is a block diagram of the touch sensor of FIG. 3, FIG. 7 is an enlarged plan view of the portion Q1 of FIG. 5, FIG. 8 is a view for explaining the arrangement of a strain gauge and a temperature compensation pattern in the display device according to an exemplary embodiment, FIG. 9 is a view showing the structure of a first layer of the sensor unit shown in FIG. 7, FIG. 10 is an enlarged plan view of the portion Q2 of FIG. 9, FIG. 11 is a view showing another exemplary embodiment of the resistance line shown in FIG. 10, FIG. 12 is a view showing another exemplary embodiment of the resistance line shown in FIG. 10, FIG. 13 is a view showing another exemplary embodiment of the resistance line shown in FIG. 10, FIG. 14 is an enlarged plan view of the portion Q3 of FIG. 9, FIG. 15 is a view showing the structure of a second layer of the sensor unit shown in FIG. 7, FIG. 16 is a cross-sectional view taken along the line X1-X1' of FIG. 7, and FIG. 17 is a cross-sectional view taken along the lines X2-X2' and X3-X3' of FIG. 7.

Referring to FIGS. 5 to 16, the sensor unit 100 includes a base layer 110 (such as the aforementioned encapsulation layer), a first electrode unit 120, a second electrode unit 130, a strain gauge 150, and a temperature compensation pattern 160, and may further include a dummy electrode 190.

The base layer 110 may include: a sensing area SA including a first region DR1, which is a flat portion, and a second region DR2, which is a curved portion extending from the left and right sides of the first region DR; and a peripheral area NSA. The base layer 110 is a layer that is a substrate of the sensor unit 100, and in some exemplary embodiments, the base layer 110 may be one of the layers constituting the display panel 300. For example, in an exemplary embodiment where the sensor unit 100 and the display panel 300 are integrated with each other, the base layer 110 may be at least one layer constituting the display panel 300. Illustratively, the base layer 110 may include a thin film encapsulation (TFE) layer of the display panel 300. According to an exemplary embodiment, the base layer 110 may be a rigid substrate or a flexible substrate. For example, the base layer 110 may be a rigid substrate including glass or reinforced glass, or a flexible substrate including a thin film made of a flexible plastic material. Hereinafter, a case where the base layer 110 includes at least one layer constituting the display panel 300, for example, a layer including a thin film encapsulation layer will be described as an example.

A first electrode unit 120, a second electrode unit 130 insulated from the first electrode unit 120, and a strain gauge 150 and a temperature compensation pattern 160, which are insulated from the first electrode unit 120 and the second electrode unit 130, respectively, may be arranged on the sensing area SA of the base layer 110.

The first electrode units 120 may be located in the first region DR1, which is a flat portion, and the second region DR2, which is curved portion extending from the left and right sides of the first region DR1. The first electrode units 120 may extend along the first direction (X-axis direction), and may be spaced apart from each other along the second direction (Y-axis direction). The first electrode units 120 spaced from each other along the second direction (Y-axis direction) may constitute electrode rows. It is illustratively shown in FIG. 5 that eight first electrode units 120 are arranged along the second direction (Y-axis direction), and each of the first electrode units 120 sequentially constitutes a first electrode row RE1, a second electrode row RE2, a third electrode row RE3, a fourth electrode row RE4, a fifth electrode row RE5, a sixth electrode row RE6, a seventh electrode row RE7, and an eighth electrode row RE8. However, the present invention is not limited thereto, and the number of the first electrode units 120 may be variously changed.

The first electrode unit 120 may include a plurality of first touch electrodes 121 arranged in the first direction (X-axis direction) and a first connection portion 123 for electrically connecting the first touch electrodes 121 adjacent to each other along the first direction (X-axis direction). Hereinafter, in the description of exemplary embodiments, the term "connection" may inclusively mean the "connection" in terms of physical and/or electrical aspects.

In some exemplary embodiments, the first touch electrode 121 may be located on a first layer L1. The planar shape of the first touch electrode 121 may be rhombic, but is not limited thereto. The shape of the first touch electrode 121 may be changed into various shapes such as a triangle, a rectangle other than a rhombus, a pentagon, a circle, and a bar.

The first touch electrode 121 may include a conductive material. Illustratively, the conductive material may include a metal or an alloy thereof. Examples of the metal may include gold (Au), silver (Ag), aluminum (Al), molybdenum (Mo), chromium (Cr), titanium (Ti), nickel (Ni), neodymium (Nd), copper (Cu), and platinum (Pt). The first touch electrode 121 may include a transparent conductive material. Examples of the transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nanotube (CNT), and graphene.

In some exemplary embodiments, the first touch electrode 121 may have a single-layer structure, or may have a multi-layer structure. When the first touch electrode 121 has a multi-layer structure, the first touch electrode 121 may include a plurality of metal layers. Illustratively, the first touch electrode 121 may have a three-layer structure of titanium/aluminum/titanium.

In some exemplary embodiments, the first touch electrode 121 may have a mesh structure in order to prevent or reduce the first touch electrode 121 from being seen by a user. When the first touch electrode 121 has a mesh structure, the first touch electrode 121 may be disposed to overlap the light emission region of the display panel 300. In other words, the first touch electrode 121 of the mesh structure may define a mesh hole overlapping the light emission region.

In some exemplary embodiments, the first electrodes 121 spaced from each other along the second direction (Y-axis direction) may constitute electrode columns. It is illustratively shown in FIG. 5 that eight first electrodes 121 are arranged in one column, and the touch electrodes 121 arranged along the second direction (Y-axis direction) constitute a first electrode column CE1, a second electrode column CE2, a third electrode column CE3, a fourth electrode column CE4, a fifth electrode column CE5, a sixth electrode column CE6, a seventh electrode column CE7, and an eighth electrode column CE8. However, the present invention is not limited thereto, and the number of the electrode columns constituted by the first electrodes 121 may be variously changed.

The third electrode column CE3, fourth electrode column CE4, fifth electrode column CE5 and sixth electrode column CD6 of the first touch electrodes 121 may be arranged in the first region DR1, which is a flat portion, and the first electrode column CE1, second electrode column CE2, seventh electrode column CE7 and eighth electrode column CE8 thereof may be arranged in the second region DR2, which is a curved portion. For example, the first electrode column CE1 and the second electrode column CE2 may be arranged in the second region DR2 extending from the first region DR1 in the first direction (X-axis direction), and the seventh electrode column CE7 and the eighth electrode column CE8 may be arranged in the second region DR2 extending from the first region DR1 in a direction opposite to the first direction (X-axis direction). However, the present invention is not limited thereto, and the number of the electrode columns CE1, CE2, CE3, CE4, CE5, CE6, CE7, and CE8 of the first touch electrodes 121, arranged in the first region DR1 and the second region DR2, may be variously changed depending on the size and function of the second region DR2 which is a curved portion.

The first touch electrode 121 may include a first opening OP1. For example, each of the first touch electrodes 121 may expose a layer located thereunder because at least a center thereof is opened. Illustratively, when an insulating layer IL is located under the first touch electrode 121, a part of the insulating layer IL may be exposed through the first opening OP1.

The first connection portion 123 may electrically connect the first touch electrodes 121 adjacent to each other along the first direction (X-axis direction), and may be in contact with the first touch electrodes 121. In some exemplary embodiments, the first connection portion 123 may be a bridge-type connection portion. In some exemplary embodiments, the first connection portion 123 may be located on a second layer L2 different from the first layer L1 in which the first touch electrode 121 is located.

In some exemplary embodiments, the insulating layer IL may be located between the first touch electrode 121 and the first connection portion 123. In some exemplary embodiments, the first connection portion 123 located on the second layer L2 may be located on the base layer 110, the insulating layer IL may be located on the first connection portion 123, and the first touch electrode 121 located on the first layer L1 may be located on the insulating layer IL. The first connection portion 123 and the first touch electrode 121 may be connected to each other through a first contact hole CH1 formed in the insulating layer IL and may be in direct contact with each other.

The insulating layer IL may include an insulating material. In some exemplary embodiments, the insulating material may be an inorganic insulating material or an organic insulating material. The inorganic insulating material may include at least one of aluminum oxide, titanium oxide, silicon oxide, silicon oxynitride, zirconium oxide, and hafnium oxide. The organic insulating material may include at least one of an acrylic resin, a methacrylic resin, polyisoprene, a vinyl resin, an epoxy resin, a urethane resin, a cellulose resin, a siloxane resin, a polyimide resin, a polyamide resin, and a perylene resin.

The first connection portion 123 may include a conductive material. In some exemplary embodiments, the first connection portion 123 may include the same material as the first touch electrode 121, or may include at least one material selected from the materials exemplified as the constituent materials of the first touch electrode 121. In some exemplary embodiments, the first connection portion 123 may have a single-layer structure or a multi-layer structure. Illustratively, the first connection portion 123 may have a three-layer structure of titanium/aluminum/titanium. However, the present invention is not limited thereto, and the first connection portion 123 may include a different material from the first touch electrode 121.

Although it is shown in the drawings that one first connection portion 123 are disposed between the first touch electrodes 121 adjacent to each other along the first direction (X-axis direction), the number of the first connection portions 123 may be variously changed. For example, two or more first connection portions 123 may be disposed between the first touch electrodes 121 adjacent to each other along the first direction (X-axis direction).

The first electrode units 120 may be located in the first region DR1, which is a flat portion, and the second region DR2, which is curved portion extending from the left and right sides of the first region DR1. The second electrode units 130 may extend along the second direction (Y-axis direction), and may be spaced apart from each other along the first direction (X-axis direction). Each of the second electrode units 130 spaced from each other along the first direction (X-axis direction) may constitute columns. It is illustratively shown in FIG. 7 that seven second electrode units 130 are arranged along the first direction (X-axis direction), and each of the second electrode units 130 sequentially constitutes a first column CO1, a second column CO2, a third column CO3, a fourth column CO4, a fifth column CO5, a sixth column CO6, and a seventh column CO7 along a direction opposite to the first direction (X-axis direction). However, the present invention is not limited thereto, and the number of the second electrode units 130 may be variously changed.

The second electrode unit 130 may include a plurality of second touch electrodes 131 arranged in the second direction (Y-axis direction) and a second connection portion 133 for electrically connecting the second touch electrodes 131 adjacent to each other along the second direction (Y-axis direction).

The plurality of second touch electrodes 131 may be electrically connected to each other along the second direction (Y-axis direction). Further, the second touch electrodes 131 may be spaced from each other along the first direction (X-axis direction).

In some exemplary embodiment, the second touch electrodes 131 spaced from each other along the first direction (X-axis direction) may constitute rows. It is illustratively shown in FIG. 7 that eight second touch electrodes 131 are arranged in one row, and the second touch electrodes 131 arranged along the first direction (X-axis direction) constitute a first row RO1, a second row RO2, a third row RO3, a fourth row RO4, a fifth row RO5, a sixth row RO6, a seventh row RO7, and an eighth row RO8. However, the present invention is not limited thereto, and the number of the rows constituted by the second touch electrodes 131 may be variously changed.

In some exemplary embodiments, any one row constituted by the second touch electrodes 131 may be located between the two electrode rows constituted by the first electrode units 120. Illustratively, the first row RO1 may be located between the first electrode row RE1 and the second electrode row RE2, and the second row RO2 may be located between the second electrode row RE2 and the third electrode row RE3. That is, the rows constituted by the second touch electrodes 131 and the electrode rows constituted by the first electrode units 120 may be repeatedly arranged along the second direction (Y-axis direction).

The third column CO3, fourth column CO4 and fifth column CO5 of the second touch electrodes 131 may be arranged in the first region DR1, which is a flat portion, and the first column CO1 and seventh column CO7 thereof may be arranged in the second region DR2, which is a curved portion, and the second column CO2 and sixth column CO6 thereof may be arranged at the boundary between the first region DR1 and the second region DR2. For example, the first column CO1 may be disposed in the second region DR2 extending from the first region DR1 in the first direction (X-axis direction), the seventh column CO7 may be disposed in the second region DR2 extending from the first region DR1 in a direction opposite to the first direction (X-axis direction), the second column CO2 may be disposed over the boundary between the first region DR1 and the second region DR2 extending from the first region DR1 in the first direction (X-axis direction), and the sixth column CO6 may be disposed over the boundary between the first region DR1 and the second region DR2 extending from the first region DR1 in a direction opposite to the first direction (X-axis direction). However, the present invention is not limited thereto, and the number of the columns CO1, CO2, CO3, CO4, CO5, CO6, and CO7 of the second touch electrodes 131, arranged in the first region DR1 and the second region DR2, may be variously changed depending on the size and function of the second region DR2 which is a curved portion.

The second touch electrode 131 may include a second opening OP2. For example, each of the second touch electrodes 131 may expose a layer located thereunder because at least a center thereof is opened. Illustratively, when an insulating layer IL is located under the second touch electrode 131, a part of the insulating layer IL may be exposed through the second opening OP2.

The area of the first opening OP1 may be the same as the area of the second opening OP2. However, the present invention is not limited thereto, and in some exemplary embodiments, the area of the second opening OP2 may be different from the area of the first opening OP1. Illustratively, the area of the second opening OP2 may be larger than the area of the first opening OP1, and conversely, the area of the first opening OP1 may be larger than the area of the second opening OP2.

In some exemplary embodiments, the second touch electrode 131 and the first touch electrode 121 may be located on the same first layer L1. The planar shape of the second touch electrode 131 may be rhombic, but is not limited thereto. The shape of the second touch electrode 131 may be changed into various shapes such as a triangle, a rectangle other than a rhombus, a pentagon, a circle, and a bar.

The second connection portion 133 may electrically connect the second touch electrodes 131 adjacent to each other along the second direction (Y-axis direction), and may be in contact with the second touch electrodes 131. In some exemplary embodiments, the second connection portion 133 may be located on the same first layer L1 as the first touch electrode 121 and the second touch electrode 131.

The second connection portion 133 may be insulated from the first connection portion 123 and may intersect the first connection portion 123. In some exemplary embodiments, an insulating layer IL may be located between the second connection portion 133 and the first connection portion 123.

The second touch electrode 131 and the second connection portion 133 may include a conductive material. In some exemplary embodiments, the second touch electrode 131 and the second connection portion 133 may include the same conductive material as the first touch electrode 121.

In some exemplary embodiments, when the first touch electrode 121 has a mesh structure, each of the second touch electrode 131 and the second connection portion 133 may also have a mesh structure.

In some exemplary embodiments, the second touch electrode 131 may be a driving electrode receiving a driving signal Ts for detecting a touch position, and the first touch electrode 121 may be a sensing electrode for outputting a sensing signal Rs for sensing a touch position.

The strain gage 150 and the temperature compensation pattern 160 may be located in the sensing area SA of the sensor unit 100.

The strain gauge 150 may be located in the rows constituted by the second electrode units 130. Illustratively, the strain gauge 150 may be located in the first row RO1, the second row RO2, the third row RO3, the fourth row RO4, the fifth row RO5, the sixth row RO6, the seventh row RO7, and the eighth row RO8.

The strain gage 150 may be disposed in the first region DR1 as a flat portion and at the boundary between the first region DR1 and the second region DR2 as a curved portion. Illustratively, the strain gauge 150 may be located in the second column CO2, the third column CO3, the fourth column CO4, the fifth column CO5 and the sixth column CO6, among the columns constituted by the second electrode units 130.

The strain gage 150 may include a first resistance line 151, a first connection line 153, and a first connection pattern 155.

The first resistance line 151 may be located in the second opening OP2 formed in the second touch electrode 131, and may be spaced apart from the first touch electrode 121. In some exemplary embodiments, the first resistance line 151 may be located in each first opening OP1.

The first resistance line 151 may be bent to have a predetermined pattern. When a pressure having a predetermined intensity is applied to the sensor unit 100 of the touch sensor TSM, the length or cross-sectional area of the first resistance line 151 is changed. When the length or cross-sectional area of the first resistance line 151 is changed, the resistance value of the first resistance line 151 is changed, and the intensity of touch pressure may be determined based on the changed resistance value.

In some exemplary embodiments, as shown in FIG. 10, the first resistance line 151 may have a shape including two or more bent portions and portions extending in the first direction (X-axis direction) in a plan view.

In addition, the shape of the first resistance line 151 may be variously changed. Illustratively, as shown in FIG. 11, the first resistance line 151_1 may include a plurality of bent portions and portions extending in parallel with the first direction (X-axis direction) in a plan view. Alternatively, as shown in FIG. 12, the first resistance line 151_2 may have an angular spiral shape, and unlike that shown in FIG. 12, the first resistance line 151_2 may have a curved spiral shape.

In some exemplary embodiments, the first resistance line 151 may be located on the same first layer L1 as the first touch electrode 121 and the second touch electrode 131.

The first resistance line 151 may include a conductive material. In some exemplary embodiments, the first resistance line 151 may include the same material as the first touch electrode 121 and the second touch electrodes 131.

When each of the first touch electrode 121 and the second touch electrode 131 has a mesh structure, the first resistance line 151 may be formed by removing a part of the mesh structure. When the first resistance line 151 is formed by removing a part of the mesh structure, in some exemplary embodiments, the first opening OP1 may be provided therein with a plurality of branches BR connected to the first resistance line 151 and spaced apart from each other as shown in FIG. 13.

The branches BR may be remnants after removing a part of the mesh structure. The branches BR may be spaced apart from the second touch electrode 131. The branches BR may be located on the same first layer L1 as the first resistance line 151, and may include the same material as the first resistance line 151.

The first connection line 153 may electrically connect the first resistance lines 151 adjacent to each other along the first direction (X-axis direction) and may be in direct contact with the first resistance line 151. The first connection line 153 may be spaced apart from the first electrode unit 120 and the second electrode unit 130 without contacting the first electrode unit 120 and the second electrode unit 130. In some exemplary embodiments, the first connection line 153 may be located on the same second layer L2 as the first connection portion 123, and may include the same material as the first connection portion 123.

In some exemplary embodiments, an insulating layer IL may be located between the first resistance line 151 and the first connection line 153, and the first resistance line 151 and the first connection line 153 may connected to each other through a second contact hole CH2 formed in the insulating layer IL and may be in direct contact with each other.

Although it is shown in the drawings that one first connection line 153 is disposed between the first resistance lines adjacent to each other along the first direction (X-axis direction), the present invention is not limited thereto, and the number of the first connection lines 153 may be variously changed. For example, two or more first connection lines 153 may be arranged between the first resistance lines adjacent to each other along the first direction (X-axis direction).

The first connection pattern 155 may electrically connect the first resistance lines 151 located in the rows adjacent to each other along the second direction (Y-axis direction), and may be in direct contact with the first resistance line 151.

In some exemplary embodiments, the first connection pattern 155 may connect two first resistance lines 151 neighboring along the second direction (Y-axis direction) and located in each row.

In some exemplary embodiments, an insulating layer IL may be located between the first resistance line 151 and the first connection pattern 155, and the first resistance line 151 and the first connection pattern 155 may connected to each other through a second contact hole CH2 formed in the insulating layer IL and may be in direct contact with each other. The first connection pattern 155 may be spaced apart from the first electrode unit 120 and the second electrode unit 130 without contacting the first electrode unit 120 and the second electrode unit 130. In some exemplary embodiments, the first connection pattern 155 may be located on the same second layer L2 as the first connection portion 123, and may include the same material as the first connection portion 123.

The exemplary connection relationship between the first connection pattern 155 and the first resistance line 151 may be as follows.

The first connection pattern 155 located between the first row RO1 and the second row RO2 may be in contact with the first resistance line 151 located in the first row RO1 and the second column CO2 and the first resistance line 151 located in the second row RO2 and the second column CO2. That is, the first resistance line 151 located in the first row RO1 and the second column CO2 and the first resistance line 151 located in the second row RO2 and the second column CO2 may be electrically connected to each other through the first connection pattern 155 located between the first row RO1 and the second row RO2.

The first resistance line 151 located in the second row RO2 and the sixth column CO6 and the first resistance line 151 located in the third row RO3 and the sixth column CO6 may be electrically connected to each other through the first connection pattern 155 located between the second row RO2 and the third row RO3.

The first resistance line 151 located in the third row RO3 and the second column CO2 and the first resistance line 151 located in the fourth row RO4 and the second column CO2 may be electrically connected to each other through the first connection pattern 155 located between the third row RO3 and the fourth row RO4.

The first resistance line 151 located in the fourth row RO4 and the sixth column CO6 and the first resistance line 151 located in the fifth row RO5 and the sixth column CO6 may be electrically connected to each other through the first connection pattern 155 located between the fourth row RO4 and the fifth row RO5.

The first resistance line 151 located in the fifth row RO5 and the second column CO2 and the first resistance line 151 located in the sixth row RO6 and the second column CO2 may be electrically connected to each other through the first connection pattern 155 located between the fifth row RO5 and the sixth row RO6.

The first resistance line 151 located in the sixth row RO6 and the sixth column CO6 and the first resistance line 151 located in the seventh row RO7 and the sixth column CO6 may be electrically connected to each other through the first connection pattern 155 located between the sixth row RO6 and the seventh row RO7.

The first resistance line 151 located in the seventh row RO7 and the second column CO2 and the first resistance line 151 located in the eighth row RO8 and the second column CO2 may be electrically connected to each other through the first connection pattern 155 located between the seventh row RO7 and the eighth row RO8.

That is, the first resistance lines 151 located in the sensing area SA may all be connected in series through the first connection line 153 and the first connection pattern 155. However, the present invention is not limited thereto, and the first resistance lines 151 located in the sensing area SA may be connected in series in groups through the first connection line 153 and the first connection pattern 155.

The temperature compensation pattern 160 may be located in the sensing area SA of the sensor unit 100. The temperature compensation pattern 160 may be located in the electrode rows constituted by the first electrode units 120. Illustratively, the temperature compensation pattern 160 may be located in the first electrode row RE1, the second electrode row RE2, the third electrode row RE3, the fourth electrode row RE4, the fifth electrode row RE5, the sixth electrode RE6, the seventh electrode row RE7, and the eighth electrode row RE8.

The temperature compensation pattern 160 may be located in the second region DR2 which is a curved portion extending from the first region DR1 in the first direction (X-axis direction) and a direction opposite to the first direction (X-axis direction). Illustratively, the temperature compensation pattern 160 may located in the first electrode column CE1, the second electrode column CE2, the seventh electrode column CE7, and the eighth electrode column CE8, among the columns constituted by the first electrode units 120.

The temperature compensation pattern 160 may include a second resistance line 161, a second connection line 163, and a second connection pattern 165.

The second resistance line 161 may be located in the first opening OP1 formed in the first touch electrode 121, and may be spaced apart from the first touch electrode 121. In some exemplary embodiments, the second resistance line 161 may be located in each first opening OP1.

The second resistance line 161 may be bent to have a predetermined pattern. When a pressure having a predetermined intensity is applied to the sensor unit 100 of the touch sensor TSM, the resistance value of the second resistance line 161 is also changed by transferring the body temperature of a user or the heat generated by the lower display panel 300. Therefore, the component based on the temperature change in the resistance value variation amount of the first resistance line 151 of the strain gage 150 may be compensated by using the resistance value change generated based on the temperature change in the second resistance line 161.

In some exemplary embodiments, as shown in FIG. 7, the second resistance line 161 may have a shape including two or more bent portions and portions extending in the second direction (Y-axis direction) in a plan view. That is, the bent portions and extended portions of the second resistance line 161 may be perpendicular to the bent portions and extended portions of the first resistance line 151. However, the present invention is not limited thereto, and the bent portions and extended portions of the second resistance line 161 may be the same as the bent portions and extended portions of the first resistance line 151. Further, the shape of the second resistance line 161 may be variously changed, and the shapes in the first resistance line 151, described with reference to FIGS. 11 to 13, may be applied to the second resistance line 161.

In some exemplary embodiments, the second resistance line 161 may be located on the same first layer L1 as the first touch electrode 121 and the second touch electrode 131.

The second resistance line 161 may include a conductive material. In some exemplary embodiments, the second resistance line 161 may include the same material as the first touch electrode 121 and the second touch electrodes 131.

The second connection line 163 may electrically connect the second resistance lines 161 adjacent to each other along the first direction (X-axis direction) and may be in direct contact with the second resistance lines 161. The second connection line 163 may be spaced apart from the first electrode unit 120 and the second electrode unit 130 without contacting the first electrode unit 120 and the second electrode unit 130. In some exemplary embodiments, the second connection line 163 may be located on the same second layer L2 as the first connection portion 123, and may include the same material as the first connection portion 123.

In some exemplary embodiments, an insulating layer IL may be located between the second resistance line 161 and the second connection line 163, and the second resistance line 161 and the second connection line 163 may connected to each other through a third contact hole CH3 formed in the insulating layer IL and may be in direct contact with each other.

Although it is shown in the drawings that one second connection line 163 is disposed between the second resistance lines 161 adjacent to each other along the first direction (X-axis direction), the present invention is not limited thereto, and the number of the second connection lines 163 may be variously changed. For example, two or more second connection lines 163 may be arranged between the two second resistance lines 161 adjacent to each other along the first direction (X-axis direction).

The second connection pattern 165 may electrically connect the second resistance lines 161 located in the electrode rows adjacent to each other along the second direction (Y-axis direction), and may be in direct contact with the second resistance line 161.

In some exemplary embodiments, the second connection pattern 165 may connect two second resistance lines 161 neighboring along the second direction (Y-axis direction) and located in each electrode row.

In some exemplary embodiments, an insulating layer IL may be located between the second resistance line 161 and the second connection pattern 165, and the second resistance line 161 and the second connection pattern 165 may connected to each other through a third contact hole CH3 formed in the insulating layer IL and may be in direct contact with each other.

The second connection pattern 165 may be spaced apart from the first electrode unit 120 and the second electrode unit 130 without contacting the first electrode unit 120 and the second electrode unit 130. In some exemplary embodiments, the second connection pattern 165 may be located on the same second layer L2 as the first connection portion 123, and may include the same material as the first connection portion 123.

The connection relationship between the second connection pattern 165 and the second resistance line 161 in the second region DR2 (curved portion) extending from the first region DR1 in the first direction DR1 (X-axis direction) may be as follows.

The second connection pattern 165 located between the first electrode row RE1 and the second electrode row RE2 may be in contact with the second resistance line 161 located in the first electrode row RE1 and the second electrode column CE2 and the second resistance line 161 located in the second electrode row RE2 and the second electrode column CE2. That is, the second resistance line 161 located in the first electrode row RE1 and the second electrode column CE2 and the second resistance line 161 located in the second electrode row RE2 and the second electrode column CE2 may be electrically connected to each other through the second connection pattern 165 located between the first electrode row RE1 and the second electrode row RE2.

The second resistance line 161 located in the second electrode row RE2 and the first electrode column CE1 and the second resistance line 161 located in the third electrode row RE3 and the first electrode column CE1 may be electrically connected to each other through the second connection pattern 165 located between the second electrode row RE2 and the third electrode row RE3.

The second resistance line 161 located in the third electrode row RE3 and the second electrode column CE2 and the second resistance line 161 located in the fourth electrode row RE4 and the second electrode column CE2 may be electrically connected to each other through the second connection pattern 165 located between the third electrode row RE3 and the fourth electrode row RE4.

The second resistance line 161 located in the fourth electrode row RE4 and the first electrode column CE1 and the second resistance line 161 located in the fifth electrode row RE5 and the first electrode column CE1 may be electrically connected to each other through the second connection pattern 165 located between the fourth electrode row RE4 and the fifth electrode row RE5.

The second resistance line 161 located in the fifth electrode row RE5 and the second electrode column CE2 and the second resistance line 161 located in the sixth electrode row RE6 and the second electrode column CE2 may be electrically connected to each other through the second connection pattern 165 located between the fifth electrode row RE5 and the sixth electrode row RE6.

The second resistance line 161 located in the sixth electrode row RE6 and the first electrode column CE1 and the second resistance line 161 located in the seventh electrode row RE7 and the first electrode column CE1 may be electrically connected to each other through the second connection pattern 165 located between the sixth electrode row RE6 and the seventh electrode row RE7.

The second resistance line 161 located in the seventh electrode row RE7 and the second electrode column CE2 and the second resistance line 161 located in the eighth electrode row RE8 and the second electrode column CE2 may be electrically connected to each other through the second connection pattern 165 located between the seventh electrode row RE7 and the eighth electrode row RE8.

That is, the second resistance lines 161 located in the second region DR2 (curved portion) extending from the first region DR1 in the first direction (X-axis direction) may be connected in series through the second connection line 163 and the second connection pattern 165. However, the present invention is not limited thereto, and the second resistance lines 161 located in the second region DR2 (curved portion) extending from the first region DR1 in the first direction (X-axis direction) may be divided into a plurality of groups and connected to each other in groups.

The connection relationship between the second connection pattern 165 and the second resistance line 161 in the second region DR2 (curved portion) extending from the first region DR1 in a direction opposite to the first direction DR1 (X-axis direction) may be as follows.

The second connection pattern 165 located between the first electrode row RE1 and the second electrode row RE2 may be in contact with the second resistance line 161 located in the first electrode row RE1 and the seventh electrode column CE7 and the second resistance line 161 located in the second electrode row RE2 and the seventh electrode column CE7. That is, the second resistance line 161 located in the first electrode row RE1 and the seventh electrode column CE7 and the second resistance line 161 located in the second electrode row RE2 and the seventh electrode column CE7 may be electrically connected to each other through the second connection pattern 165 located between the first electrode row RE1 and the second electrode row RE2.

The second resistance line 161 located in the second electrode row RE2 and the eighth electrode column CE8 and the second resistance line 161 located in the third electrode row RE3 and the eighth electrode column CE8 may be electrically connected to each other through the second connection pattern 165 located between the second electrode row RE2 and the third electrode row RE3.

The second resistance line 161 located in the third electrode row RE3 and the seventh electrode column CE7 and the second resistance line 161 located in the fourth electrode row RE4 and the seventh electrode column CE7 may be electrically connected to each other through the second connection pattern 165 located between the third electrode row RE3 and the fourth electrode row RE4.

The second resistance line 161 located in the fourth electrode row RE4 and the eighth electrode column CE8 and the second resistance line 161 located in the fifth electrode row RE5 and the eighth electrode column CE8 may be electrically connected to each other through the second connection pattern 165 located between the fourth electrode row RE4 and the fifth electrode row RE5.

The second resistance line 161 located in the fifth electrode row RE5 and the seventh electrode column CE7 and the second resistance line 161 located in the sixth electrode row RE6 and the seventh electrode column CE7 may be electrically connected to each other through the second connection pattern 165 located between the fifth electrode row RE5 and the sixth electrode row RE6.

The second resistance line 161 located in the sixth electrode row RE6 and the eighth electrode column CE8 and the second resistance line 161 located in the seventh electrode row RE7 and the eighth electrode column CE8 may be electrically connected to each other through the second connection pattern 165 located between the sixth electrode row RE6 and the seventh electrode row RE7.

The second resistance line 161 located in the seventh electrode row RE7 and the seventh electrode column CE7 and the second resistance line 161 located in the eighth electrode row RE8 and the seventh electrode column CE7 may be electrically connected to each other through the second connection pattern 165 located between the seventh electrode row RE7 and the eighth electrode row RE8.

That is, the second resistance lines 161 located in the second region DR2 (curved portion) extending from the first region DR1 in a direction opposite to the first direction (X-axis direction) may be connected in series through the second connection line 163 and the second connection pattern 165. However, the present invention is not limited thereto, and the second resistance lines 161 located in the second region DR2 (curved portion) extending from the first region DR1 in a direction opposite to the first direction (X-axis direction) may be divided into a plurality of groups and connected to each other in groups. Further, the second resistance lines 161 located in the second region DR2 extending from the first region DR1 in the first direction (X-axis direction) and the second resistance lines 161 located in the second region DR2 extending from the first region DR1 in a direction opposite to the first direction (X-axis direction) may be connected in series.

In some exemplary embodiments, all of the second connection patterns 165 may be located in the sensing area SA as shown in FIG. 7, but the present invention is not limited thereto. In another exemplary embodiment, some of the second connection patterns 165 may be located in the peripheral area NSA.

Since the second region DR2, which is a curved portion, is less deformed by pressure than the first region DR1, which is a flat portion, the first resistance lines 151 of the strain gauge 150 for pressure sensing are arranged in the first region DR1 relatively greatly deformed by pressure as shown in FIG. 8, and the second resistance lines 161 of the temperature compensation pattern 160 are arranged in the second region DR2 relatively slightly deformed by pressure, thereby more accurately compensating the change in resistance value caused based on the temperature change. Therefore, the touch sensor TSM may more accurately sense the pressure.

Figure 24:
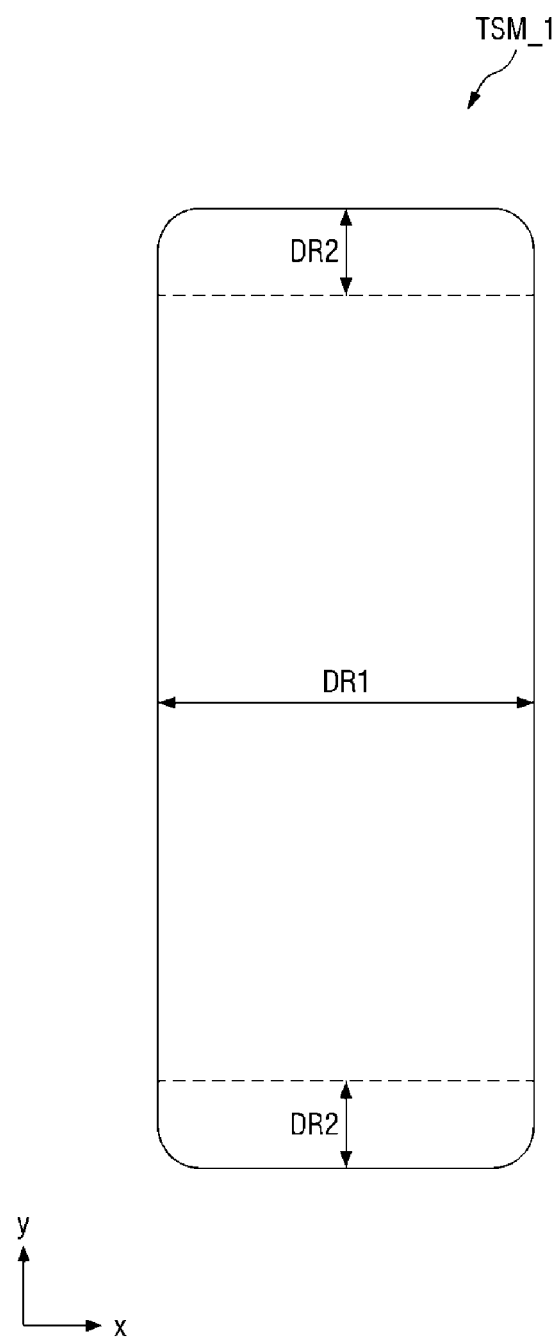
FIGS. 24 to 27 are views schematically showing the shapes of touch sensors according to other exemplary embodiments.
Figure 25:
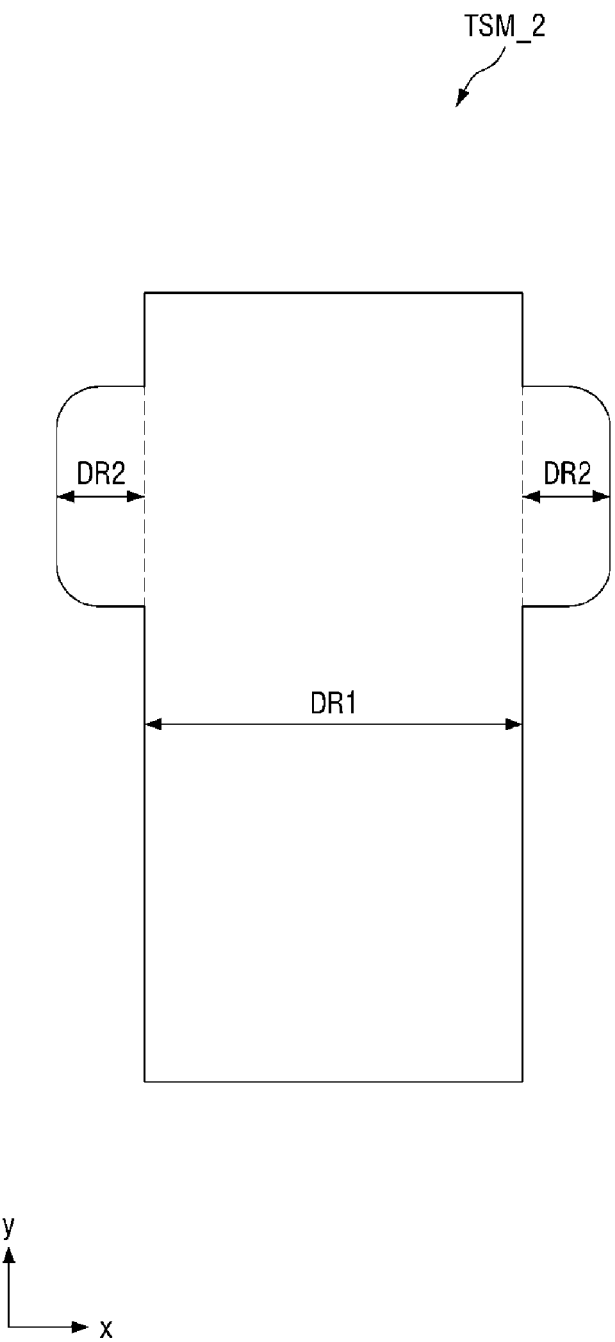

Although it is illustrated in FIG. 7 that the second region DR2, which is a curved portion where the temperature compensation pattern 160 is located, extends from the first region DR1 in the first direction (X-axis direction) and in the direction opposite to the second direction (Y-axis direction) and that the length of the second region DR2 in the second direction (Y-axis direction) is equal to the length of the first region DR1 in the second direction (Y-axis direction), this is an example, and the present invention is not limited thereto. FIGS. 24 to 27 are views schematically showing the shapes of touch sensors according to other exemplary embodiments. In some exemplary embodiments, as shown in FIG. 24, the second region DR2, which is a curved portion, may extend from the first region DR1 in the second direction (Y-axis direction) and in the direction opposite to the second direction (Y-axis direction), and in some exemplary embodiments, as shown in FIG. 25, the second region DR2, which is a curved portion, may extend from the first region DR1 in the first direction (X-axis direction) and in the direction opposite to the first direction (X-axis direction) and the length of the second region DR2 in the second direction (Y-axis direction) may be shorter than the length of the first region DR1 in the second direction (Y-axis direction).

Figure 26:
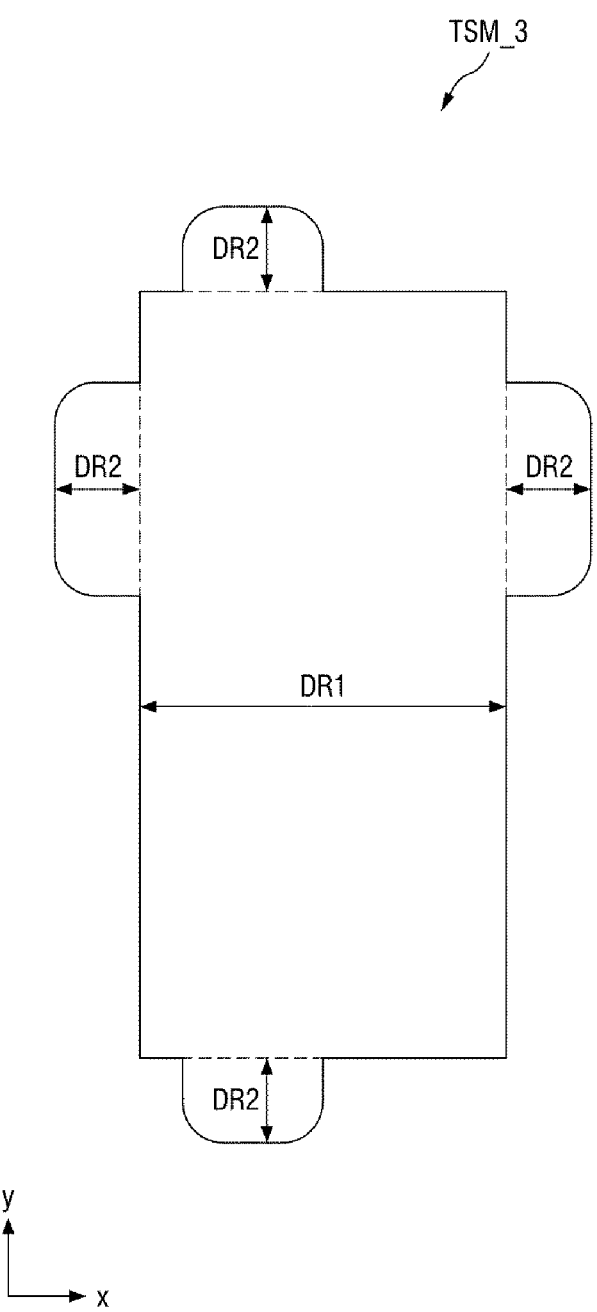

Further, in some exemplary embodiments, as shown in FIG. 26, the second region DR2, which is a curved portion, may have a smaller length than the first region DR1 in the second direction (Y-axis direction) and extend from the first region DR1 in the first direction (X-axis direction) and in the direction opposite to the first direction (X-axis direction), and the second region DR2, which is a curved portion, may have a smaller length than the first region DR1 in the first direction (X-axis direction) and extend from the first region DR1 in the second direction (Y-axis direction) and in the direction opposite to the second direction (Y-axis direction).

Figure 27:
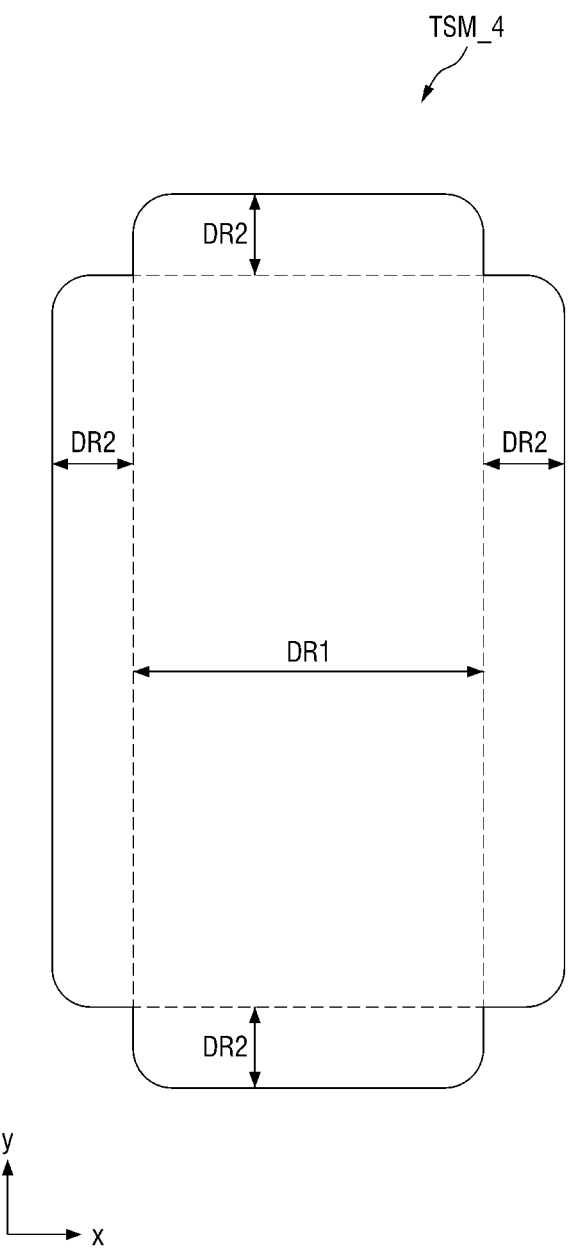

Further, in some exemplary embodiments, as shown in FIG. 27, the second region DR2, which is a curved portion, may have an equal length to the first region DR1 in the second direction (Y-axis direction) and extend from the first region DR1 in the first direction (X-axis direction) and in the direction opposite to the first direction (X-axis direction), and the second region DR2, which is a curved portion, may have an equal length to the first region DR1 in the first direction (X-axis direction) and extend from the first region DR1 in the second direction (Y-axis direction) and in the direction opposite to the second direction (Y-axis direction).

Referring to FIGS. 5 to 16 again, the dummy electrodes 190 may be located in the first opening OP1 of the first touch electrode 121 and the second opening OP2 of the second touch electrode 131. Illustratively, the dummy electrodes 190 may be disposed in the first opening OP1 of the first touch electrode 121 in which the second resistance line 161 is not disposed and in the second opening OP2 of the second touch electrode 131 in which the first resistance line 151 is not disposed. In some exemplary embodiments, the dummy electrodes 190 may be respectively disposed in the first opening OP1 of the first touch electrode 121 in which the second resistance line 161 is not disposed and in the second opening OP2 of the second touch electrode 131 in which the first resistance line 151 is not disposed. When the first opening OP1 of the first touch electrode 121 and the second opening OP2 of the second touch electrode 131 are formed, a difference in external light reflectance may occur, and thus pattern unevenness may be visually recognized from the outside. The dummy electrode 190 may has an advantage of reducing a possibility of visual recognition of pattern unevenness from the outside by reducing the difference in external light reflectance.

In some exemplary embodiments, the dummy electrode 190 may have the same shape as the first opening OP1 and the second opening OP2. Illustratively, when the first opening OP1 and the second opening OP2 are rectangular in shape such as rhombus, the dummy electrode 190 may be formed in a rectangular shape such as rhombus.

The dummy electrodes 190 may be disposed in the first opening OP1 and the second opening OP2, and may be spaced apart from the first touch electrode 121 and the second touch electrode 131. That is, each of the dummy electrodes 190 may have an island pattern. In some exemplary embodiments, the dummy electrode 190 may be a floating electrode.

The dummy electrode 190 may be located on the same first layer L1 as the first touch electrode 121, the second touch electrode 131, the first resistance line 151 and the second resistance line 161, and may include the same material as the same first layer L1 as the first touch electrode 121, the second touch electrode 131, the first resistance line 151 and the second resistance line 161.

In some exemplary embodiments, when the first touch electrode 121 and the second touch electrode 131 have a mesh structure, as shown in FIG. 14, the dummy electrode 190 may have a mesh structure.

In some exemplary embodiments, wirings 901, 903, and 903' and signal lines may be arranged on the peripheral area NSA of the base layer 110.

The wirings 901, 903, and 903' may include a first wring 901 connected to each first electrode unit 120, a second wiring 903 connected to one end of each second electrode unit 130, and a third wiring 903' connected to the other end of each second electrode unit 130. Here, the other end of the second electrode unit 130 refers to an end opposite to one end of the second electrode unit 130 to which the second wiring 903 is connected. That is, the wiring connected to the second electrode unit 130 may have a double routing structure, and thus RC delay caused by the resistance of the second electrode unit 130 or the like may be improved. However, the present invention is not limited thereto, and unlike that shown in FIG. 7, the second wiring 903 may be connected to one end of the second electrode unit 130, and any wiring may not be connected to the other end of the second electrode unit 130. That is, in another exemplary embodiment, the wiring connected to the second electrode unit 130 may have a single routing structure.

The signal lines 9111, 9113, 9115, 9117, 9125, and 9127 may include first and second signal lines 9111 and 9113 connected to one end and the other end of the strain gauge 150, third and fourth signal lines 9115 and 9117 connected to one end and the other end of the temperature compensation pattern 160 disposed in the second region DR2 (curved portion) extending from the first region DR1 in a direction opposite to the first direction (X-direction), and fifth and sixth signal lines 9125 and 9127 connected to one end and the other end of the temperature compensation pattern 160 disposed in the second region DR2 (curved portion) extending from the first region DR1 in the first direction (X-direction).

The first signal line 9111 may be connected to one end of the strain gauge 150. Illustratively, the first signal line 9111 may be connected to the first resistance line 151 located in the eighth row RO8 and the sixth column CO6 in the strain gage 150.

The second signal line 9113 may be connected to the other end of the strain gauge 150. Illustratively, the second signal line 9113 may be connected to the first resistance line 151 located in the first row RO1 and the sixth column CO6 in the strain gage 150.

In some exemplary embodiments, the first signal line 9111 may be located at a side opposite to the first wiring 901 with the sensing area SA therebetween, and the second signal line 9113 may be located at the lower side of the sensing area SA. In some exemplary embodiments, the first signal line 9111 is located in the peripheral area NSA, but may be located between the third wiring 903' and the sensing area SA, and may be disposed at a side opposite to the third wiring 903' in the second direction (Y-axis direction) with the sensing area SA therebetween.

The third signal line 9115 may be connected to one end of the temperature compensation pattern 160 disposed in the second region DR2 (curved portion) extending from the first region DR1 in a direction opposite to the first direction (X-axis direction). Illustratively, the third signal line 9115 may be connected to the second resistance line 161 located in the eighth electrode row RE8 and the eighth electrode row CE8 in the temperature compensation pattern 160.

The fourth signal line 9117 may be connected to the other end of the temperature compensation pattern 160 disposed in the second region DR2 (curved portion) extending from the first region DR1 in a direction opposite to the first direction (X-axis direction). Illustratively, the fourth signal line 9117 may be connected to the second resistance line 161 located in the first electrode row RE1 and the eighth electrode row CE8 in the temperature compensation pattern 160.

In some exemplary embodiments, the third signal line 9115 and the fourth signal line 9117 may be located at a side opposite to the first wiring 901 with the sensing are SA therebetween. In some exemplary embodiments, the third signal line 9115 and the fourth signal line 9117 are located in the peripheral area NSA, but may be located between the third wiring 903' and the sensing area SA.

The fifth signal line 9125 may be connected to one end of the temperature compensation pattern 160 disposed in the second region DR2 (curved portion) extending from the first region DR1 in the first direction (X-axis direction). Illustratively, the fifth signal line 9125 may be connected to the second resistance line 161 located in the eighth electrode row RE8 and the first electrode row CE1 in the temperature compensation pattern 160.

The sixth signal line 9127 may be connected to the other end of the temperature compensation pattern 160 disposed in the second region DR2 (curved portion) extending from the first region DR1 in the first direction (X-axis direction). Illustratively, the sixth signal line 9127 may be connected to the second resistance line 161 located in the first electrode row RE1 and the first electrode row CE1 in the temperature compensation pattern 160.

In some exemplary embodiments, the fifth signal line 9125 and the sixth signal line 9127 may be located at a side opposite to the third wiring 903' with the sensing are SA therebetween.

Touch pads TP1 and TP2 may be located on the peripheral area NSA of the base layer 110. The touch pads TP1 and TP2 may be connected to the wirings 901, 903, and 903' and the signal lines 9111, 9113, 9115, 9117, 9125, and 9127. The touch control unit 200 may be electrically connected to the touch pads TP1 and TP2.

In some exemplary embodiments, the touch pads TP1 and TP2 may include a first touch pad TP1 and a second touch pad TP2 that are spaced apart from each other along the first direction (X-axis direction). Illustratively, the first touch pad TP1 may be connected to the second wiring 903, the third wiring 903', the first signal line 9111, the second signal line 9113, the third signal line 9115, and the fourth signal line 9117, and the second touch pad TP2 may be connected to the first wiring 901, the fifth signal line 9125, and the sixth signal line 9127. However, the present invention is not limited thereto. For example, the first touch pad TP1 and the second touch pad TP2 may be formed as one pad unit without being spaced apart from each other. The wirings and signal lines respectively connected to the first touch pad TP1 and the second touch pad TP2 may be variously changed.

As shown in FIG. 6, the touch control unit 200 may be electrically connected to the sensor unit 100 to supply a driving signal Ts to the sensor unit 100, and may receive a sensing signal Rs corresponding to the driving signal TS from the sensor unit 100 to detect a touch position. Further, the touch control unit 200 may be electrically connected to the strain gauge 150 to detect a touch pressure, and may be electrically connected to the temperature compensation pattern 160 to compensate a change in resistance value caused based on a temperature change.

In some exemplary embodiments, the touch control unit 200 may include a touch driver 210, a touch detector 230, and a pressure detector 250.

The touch driver 210 may provide a driving signal TS for detecting a touch input to the second electrode unit 130.

The touch detector 230 may receive a sensing signal Rs corresponding to the driving signal Ts from the first electrode unit 120 to detect the presence and/or position of the touch input. In some exemplary embodiments, the sense signal Rs may be a change in mutual capacitance between the first electrode unit 120 and the second electrode unit 130. Illustratively, when a touch input is generated, a capacitance is changed at the point where the touch input is provided or at the periphery thereof. The touch detector 230 may receive a change in mutual capacitance between the first electrode unit 120 and the second electrode unit 130 as the sensing signal Rs, and may determine the presence and/or position of the touch input using the change in mutual capacitance. Further, the touch detector 230 may receive a change in resistance value due to user's body temperature or heat caused by the lower display panel 300 at the time of touch input, and may compensate a component based on temperature change in the change in resistance value of the strain gauge 150 using the change in resistance value.

In some exemplary embodiments, the touch detector 230 may include at least one amplifier for amplifying the received sensing signal Rs, an analog digital converter connected to the output end of the amplifier, and a processor. Details thereof will be described later with reference to FIG. 20.

In some exemplary embodiments, the touch driver 210, the touch detector 230, and the pressure detector 250 may be integrated in one touch IC. However, the present invention is not limited thereto.

In some other exemplary embodiments, the touch driver 210 and the touch detector 230 may be integrated in one touch IC, and the pressure detector 250 may be located in a portion other than the interior of the touch IC. Illustratively, the pressure detector 250 may be disposed on the display panel 300, or may be disposed on a separate flexible circuit board.

In the touch sensor TSM according to the aforementioned exemplary embodiment, the first touch electrode 121, the second touch electrode 131, the first resistance line 151, and the second resistance line 161 are located on the same first layer L1, so that there is an advantage that the first touch electrode 121, the second touch electrode 131, the first resistance line 151, and the second resistance line 161 may be simultaneously formed in the same process. Thus, there is an advantage of simplifying a manufacturing process. Further, the first resistance line 151 of the strain gauge 150 for pressure sensing may disposed in the first region DR1 which is a flat portion, and the second resistance line 161 of the temperature compensation pattern 160 may be disposed in the second region DR2 which is a curved portion, thereby more accurately compensating the change in resistance value caused based on temperature change. Therefore, there is an advantage that the touch sensor TSM can sense pressure more precisely.

Figure 18:
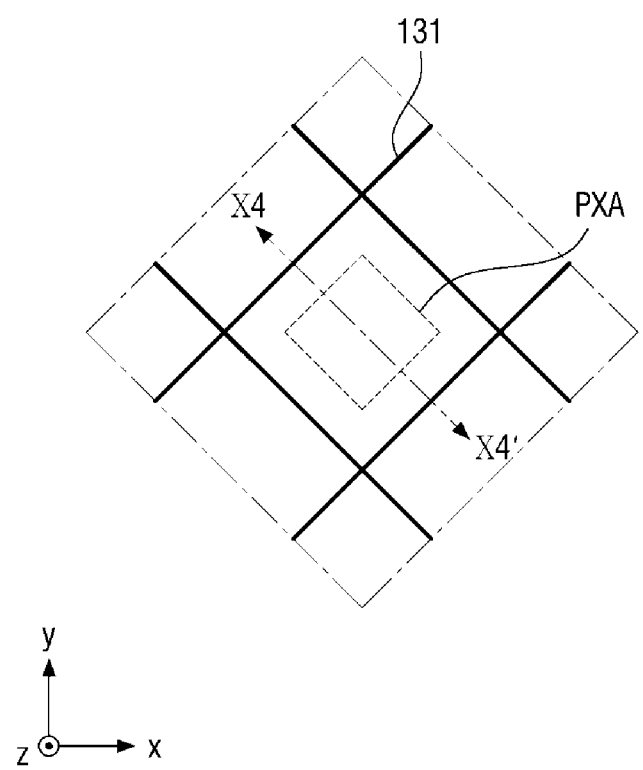
FIG. 18 is an enlarged plan view of the portion Q4 of FIG. 9.
Figure 19:
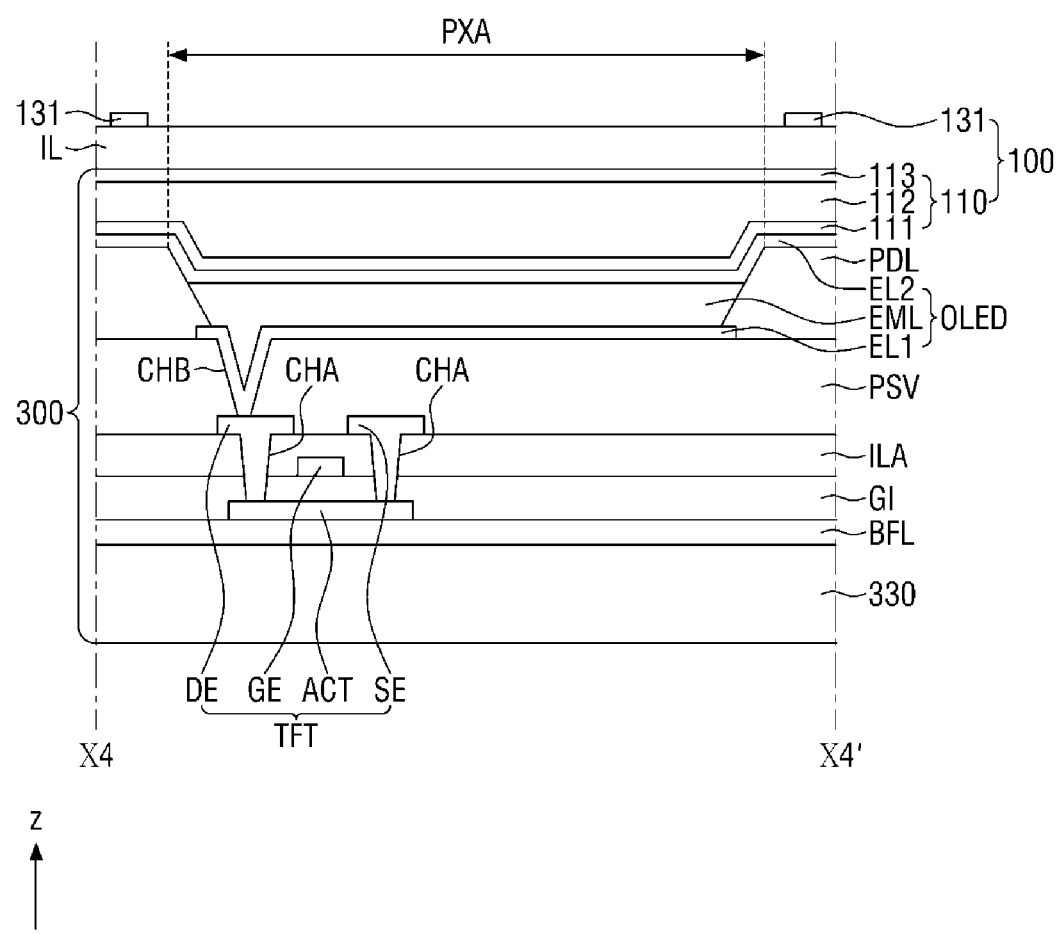
FIG. 19 is an exemplary cross-sectional view of a sensor unit and a display panel, taken along the line X4-X4' of FIG. 18.

FIG. 18 is an enlarged plan view of the portion Q4 of FIG. 9, and FIG. 19 is an exemplary cross-sectional view of a sensor unit and a display panel, taken along the line X4-X4' of FIG. 18.

Referring to FIGS. 18 and 19, the sensor unit 100 may include a thin film encapsulation layer of the display panel (particularly, organic light emitting display panel) 300 as the base layer 110. That is, the display panel 300 and the sensor unit 100 may be formed integrally. Hereinafter, the same reference numerals are given to the base layer 110 and the thin film encapsulation layer. For convenience, FIG. 19 will shows only a light emitting element (for example, an organic light emitting diode (OLED)) and one thin film transistor (TFT) connected thereto among the components provided for each pixel of the display panel 300.

The display panel 300 includes a base substrate 330, an light emitting element OLED provided on one side of the base substrate 330, and a thin film encapsulation layer 110 provided on the light emitting element OLED to at least cover the light emitting element OLED. A thin film transistor TFT may be located between the base substrate 330 and the light emitting element OLED.

In addition, the display panel 300 may further include at least one power supply line, a signal line, and/or a capacitor, not shown.

According to an exemplary embodiment, the base substrate 330 may be a rigid substrate or a flexible substrate, and the material thereof is not particularly limited. For example, the base substrate 330 may be a thin film substrate having flexible characteristics.

A buffer layer BFL is provided on one side of the base substrate 330. The buffer layer BFL may prevent or reduce impurities from diffusing from the base substrate 330, and may improve the flatness of the base substrate 330. The buffer layer BFL may be provided as a single layer, but may also be provided as a multi-layer of at least two or more layers. The buffer layer BFL may be an inorganic insulating film made of an inorganic material. For example, the buffer layer BFL may be formed of silicon nitride, silicon oxide, silicon oxynitride, or the like.

A thin film transistor is provided on the buffer layer BFL. The thin film transistor TFT includes an active layer ACT, a gate electrode GE, a source electrode SE, and a drain electrode DE. According to an exemplary embodiment, the active layer ACT is provided on the buffer layer BFL and may be formed of a semiconductor material. For example, the active layer ACT may be a semiconductor pattern layer made of polysilicone, amorphous silicone, oxide semiconductor, or the like. One region (for example, a region overlapping the gate electrode) of the active layer ACT may not be doped with impurities, and the remaining region thereof may be doped with impurities.

A gate insulating film GI may be provided on the active layer ACT, and the gate electrode GE may be provided on the gate insulating film GI. Further, an interlayer insulating film ILA may be provided on the gate electrode GE, and the source electrode SE and the drain electrode DE may be provided on the interlayer insulating film ILA. The source electrode SE and the drain electrode DE may be in contact with the active layer ACT through respective contact holes CHA penetrating the gate insulating film GI and the interlayer insulating film ILA, and may be electrically connected to the active layer ACT.

According to an exemplary embodiment, a passivation layer PSV is provided on the source electrode SE and the drain electrode DE. The passivation layer PSV may cover the thin film transistor TFT.

A light emitting element OLED is provided on the passivation layer PSV. The light emitting element OLED may include a light emitting layer EML interposed between the first electrode EL1 and the second electrode EL2. According to an exemplary embodiment, the first electrode EL1 of the light emitting element OLED may be an anode electrode, but is not limited thereto. The first electrode EL1 of the light emitting element OLED is in contact with one electrode of the thin film transistor TFT, for example, the drain electrode DE through a contact hole CHB penetrating the passivation layer PSV and is electrically connected to the drain electrode DE.

A pixel defining layer PDL for partitioning the light emitting area PXA of each pixel is provided on one surface of the base substrate 330 on which the first electrode EL1 of the light emitting element OLED is formed. The pixel defining layer PDL may expose the upper surface of the first electrode EL1, and may protrude from the base substrate 330 along the periphery of each pixel area.

The light emitting layer EML is provided in the light emitting area PXA surrounded by the pixel defining layer PDL. In one example, the light emitting layer EML may be disposed on the exposed surface of the first electrode EL1. According to an exemplary embodiment, the light emitting layer EML may have a multi-layer thin film structure including at least a light generating layer. For example, the light emitting layer EML may include a hole injection layer, a hole transport layer, a light generating layer, a hole blocking layer (HBL), an electron transport layer (ETL), and an electron injection layer (EIL). According to an exemplary embodiment, the color of light generated in the light emitting layer EML may be one of red, green, and blue, but is not limited thereto. For example, the color of light generated in the light emitting layer EML may be one of magenta, cyan, and yellow.

The second electrode EL2 of the light emitting element OLED may be disposed on the light emitting layer EML. The second electrode EL2 of the light emitting element OLED may be a cathode electrode.

A thin film encapsulation layer 110 covering the second electrode EL2 of the light emitting element OLED may be provided on the second electrode EL2 of the light emitting element OLED. The thin film encapsulation layer 110 seals the light emitting element OLED. The thin film encapsulation layer 110 includes at least one inorganic film (hereinafter, referred to as encapsulation inorganic film). The thin film encapsulation layer 110 may further include at least one organic film (hereinafter referred to as an encapsulation organic film). The encapsulation inorganic film protects the light emitting element OLED from moisture/oxygen, and the encapsulation organic film protects the light emitting element OLED from foreign substances such as dust particles. When the light emitting element OLED is sealed using the thin film encapsulation layer 110, the thickness of the display device may be reduced, and flexible characteristics may be secured.

The thin film encapsulation layer 110 may have a multi-layer structure or single-layer structure. For example, the thin film encapsulation layer 110 may include a first encapsulation inorganic film 111, an encapsulation organic film 112, and a second encapsulation inorganic film 113, which are sequentially laminated on the second electrode EL2.

In some exemplary embodiments, each of the first encapsulation inorganic film 111 and the second encapsulation inorganic film 113 may be made of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride (SiON), lithium fluoride, or the like.

In some exemplary embodiments, the encapsulation organic film 112 may be made of acrylic resin, methacrylic resin, polyisoprene, vinyl resin, epoxy resin, urethane resin, cellulose resin, perylene resin, or the like.

However, the structure of the thin film encapsulation layer 110 is not limited to the above example, and the lamination structure of the thin film encapsulation layer 110 may be variously changed.

The structure of the aforementioned second layer L2 may be disposed on the thin film encapsulation layer 110, an insulating layer IL may be disposed on the second layer L2, and the first layer L1 may be disposed on the insulating layer IL. In the drawing, the first touch electrode 121 is shown as a configuration of the first layer L1. The first touch electrode 121 may have a mesh structure in order to prevent or reduce the first touch electrode 121 from being seen to a user as described above, and may be disposed not to overlap the light emitting area PXA. In other words, a mesh hole overlapping the light emitting area PXA may be defined in the first touch electrode 121 of the mesh structure.

In the display device 1 according to the aforementioned exemplary embodiment, the display panel 300 is implemented as an organic light emitting display panel having the thin film encapsulation layer 110, and the components of the sensor unit 100 are disposed on the thin film encapsulation layer 110. The first connection line 153 and first connection pattern 155 of the strain gauge 150, the second connection line 163 and second connection pattern 165 of the temperature compensation pattern 160, and the first connection portion of the first electrode unit 120 may be disposed on the thin film encapsulation layer 110, and the insulating layer IL may be disposed thereon, and the first touch electrode 121, the second touch electrode 131, the second connection portion 133, the first resistance line 151, the second resistance line 161, and the dummy electrode 190 may be disposed on the insulating layer IL.

The touch position detecting operation of the touch control unit 200 will be described with reference to FIG. 20.

Figure 20:
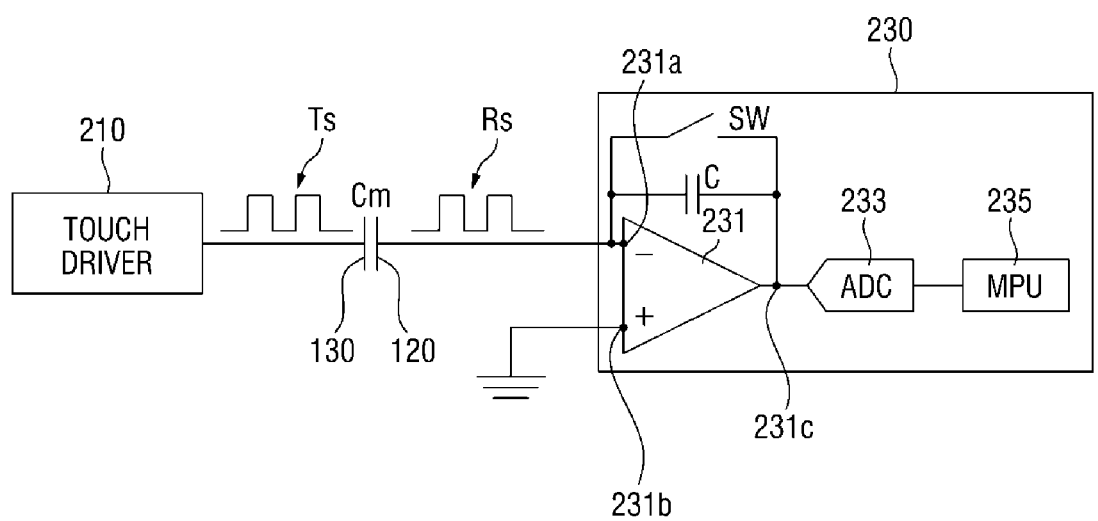
FIG. 20 is a view for explaining a touch position detecting operation of the touch sensor according to an exemplary embodiment.

FIG. 20 is a view for explaining a touch position detecting operation of the touch sensor according to an exemplary embodiment.

Referring to FIG. 20, the touch driver 210 may provide a driving signal Ts to the second electrode unit 130 through the second wiring 903. In some exemplary embodiments, the driving signals TS may be sequentially provided to the second electrode unit 130.

The touch detector 230 may receive a sensing signal Rs from the first electrode unit 120 through the first wiring 901. In some exemplary embodiments, as described above, the sensing signal Rs may include information about the mutual capacitance change generated between the first electrode unit 120 and the second electrode unit 130. When the driving signal Ts is provided to the second electrode unit 130, a mutual capacitance Cm is formed between the second electrode unit 130 and the first electrode unit 120. In this case, when a touch input occurs, the mutual capacitance Cm is changed, and thus the sensing signal Rs may include information about the aforementioned mutual capacitance change.

In some exemplary embodiments, the touch detector 230 may include at least one amplifier 231 such as an operational amplifier, an analog-to-digital converter 233, and a processor 235.

The amplifier 231 may include a first input terminal 231a, a second input terminal 231b, and an output terminal 231c. According to an exemplary embodiment, the first input terminal 231a of the amplifier 231, for example, the inverting input terminal of the operational amplifier may be electrically connected to the first electrode unit 120 through the first wiring 901, and the sensing signal Rs may be input to the first input terminal 231a.

In some exemplary embodiments, the second input terminal 231b of the amplifier 231, for example, the non-inverting input terminal of the operational amplifier is a reference potential terminal, and may be connected to a reference power source (reference power source) as an example. In some exemplary embodiments, the reference power source may be a ground (GND) power source. The sensing signal Rs may be provided to the second input terminal 231b of the amplifier 231. Thus, the reference voltage of each of the amplifiers 231 is changed according to the voltage change of a noise sensing electrode unit 170. That is, the reference potential of each of the amplifiers 231 may be changed according to the potential (voltage level) of the noise sensing electrode unit 170.

In some exemplary embodiments, a capacitor C and a reset switch SW may be connected in parallel between the first input terminal 231a and output terminal 231c of the amplifier 231.

Although it is described in the above example that the amplifier 231 is implemented in the form of a non-inverting amplifier, the present invention is not limited thereto. In another exemplary embodiment, the amplifier 231 may be implemented in the form of an inverting amplifier or the like.

The output terminal 231c of the amplifier 231 may be electrically connected to the analog-to-digital converter 233.

The analog-to-digital converter 233 may convert the input analog signal into a digital signal. In some exemplary embodiments, the analog-to-digital converter 233 may be provided as many as the number of the first electrode units 120 so as to correspond to each of the first electrode units 120 in a one-to-one correspondence. Alternatively, in another embodiment, each of the first electrode units 120 may be configured to share one analog-to-digital converter 233, and in this case, a switching circuit for channel selection may be additionally provided.

The processor 235 processes the converted signal (digital signal) from the analog-to-digital converter 233 and detects a touch input according to the signal processing result. For example, the processor 235 may comprehensively analyze the first sensing signal amplified by the amplifier 231 and converted by the analog-to-digital converter 233 to detect whether or not the touch input is generated and detect the position of the touch input. According to an exemplary embodiment, the processor 235 may be implemented as a microprocessor (MPU). In this case, a memory required for driving the processor 235 may be additionally provided in the touch detector 230. Meanwhile, the configuration of the processor 235 is not limited thereto. As another example, the processor 235 may be implemented as a microcontroller (MCU) or the like.

Hereinafter, the touch pressure detecting operation of the touch control unit 200 will be described with reference to FIGS. 21 and 22.

Figure 21:
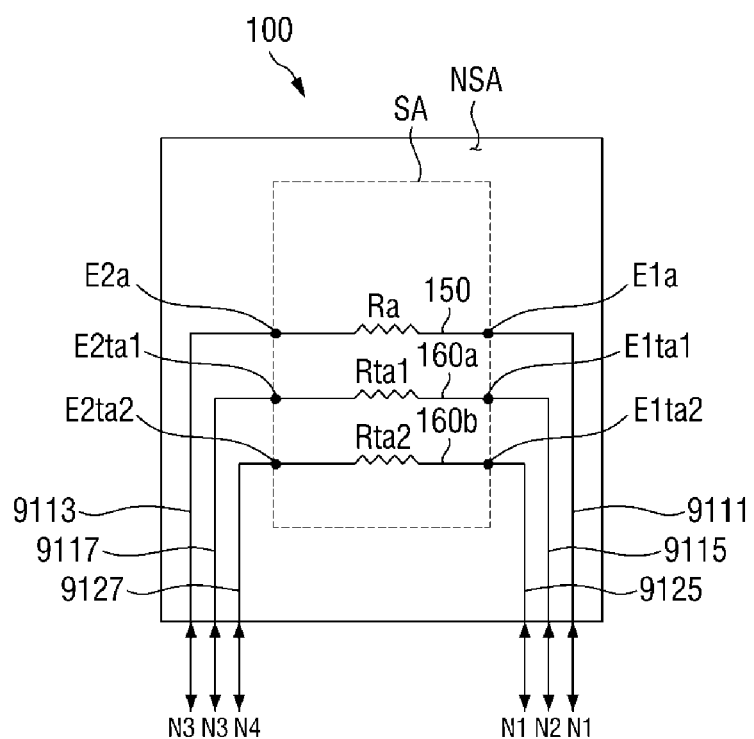
FIG. 21 is a plan view schematically showing the arrangement of the strain gauge, temperature compensation pattern and signal lines shown in FIG. 5 and the connection relationship with a Wheatstone Bridge circuit.
Figure 22:
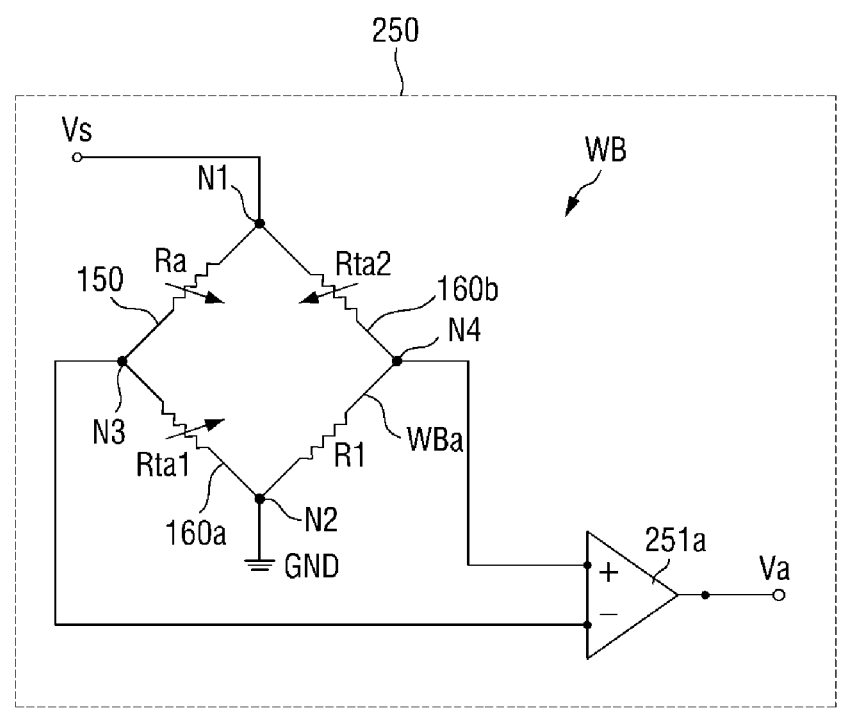
FIG. 22 is a view for explaining a touch pressure detecting operation of the touch sensor according to an exemplary embodiment, and more particularly a view showing a circuit electrically connected to the strain gauge and temperature compensation pattern shown in FIG. 21.
Figure 23:
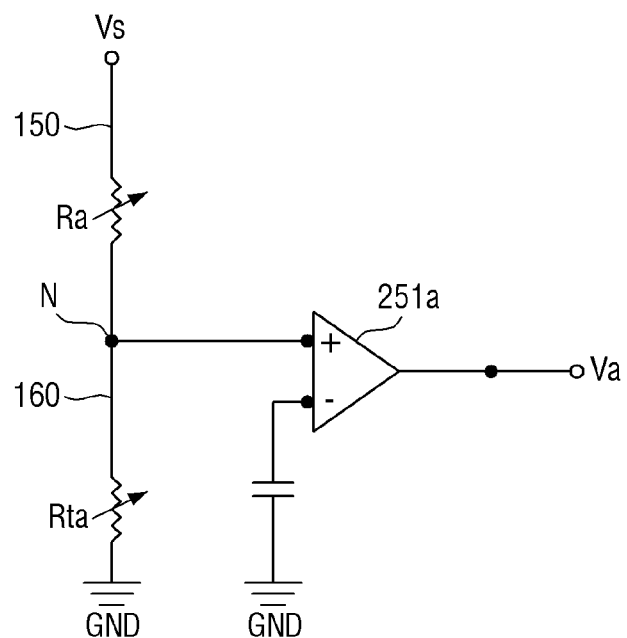
FIG. 23 is a view for explaining a touch pressure detecting operation of the touch sensor according to another exemplary embodiment, and more particularly a view showing a circuit electrically connected to the strain gauge and temperature compensation pattern shown in FIG. 21.

FIG. 21 is a plan view schematically showing the arrangement of the strain gauge, temperature compensation pattern and signal lines shown in FIG. 5 and the connection relationship with a Wheatstone Bridge circuit, FIG. 22 is a view for explaining a touch pressure detecting operation of the touch sensor according to an exemplary embodiment, and more particularly a view showing a circuit electrically connected to the strain gauge and temperature compensation pattern shown in FIG. 21, and FIG. 23 is a view for explaining a touch pressure detecting operation of the touch sensor according to another exemplary embodiment, and more particularly a view showing a circuit electrically connected to the strain gauge and temperature compensation pattern shown in FIG. 21.

Referring to FIGS. 21 and 22, in the present exemplary embodiment, the strain gage 150, the temperature compensation pattern 160, and the first resistor WBa may be connected to each other to form a Wheatstone Bridge. Illustratively, the pressure detector 250 may include a Wheatstone Bridge circuit WB. The pressure detector 250 may further include an analog-to-digital converter for detecting the first voltage Va output from the Wheatstone Bridge circuit WB, and a processor.

The Wheatstone Bridge circuit WB includes a first node N1, a second node N2, a first output node N3, and a second output node N4. A driving voltage Vs may be provided to the first node N1, and the second node N2 may be connected to the ground GND.

One end E1a of the strain gage 150 may be electrically connected to the first node N1 through the first signal line 9111, and the other end E2a of the strain gage 150 may be connected to the first output node N3 through the second signal line 9113.

One end E1ta1 of the temperature compensation pattern 160a disposed in the second region DR1 (curved portion) extending from the first region DR1 in a direction opposite to the first direction (X-axis direction) may be connected to the second node N2 through the third signal line 9115, and the other end E2ta1 of the temperature compensation pattern 160a may be connected to the first output node N3 through the fourth signal line 9117.

One end E1ta2 of the temperature compensation pattern 160b disposed in the second region DR1 (curved portion) extending from the first region DR1 the first direction (X-axis direction) may be connected to the first node N1 through the fifth signal line 9125, and the other end E2ta2 of the temperature compensation pattern 160b may be connected to the fourth node N4 through the sixth signal line 9127.

The Wheatstone Bridge circuit WB may further include a first resistor WBa connected to the second node N2 and the second output node N4.

The resistance value R1 of the first resistor WBa may have a predetermined value. That is, the first resistor WBa may be a fixed resistor.

The Wheatstone Bridge circuit WB1 may further include a second amplifying circuit 251a such as an operational amplifier. The second amplifying circuit 251a may include an inverting input terminal, a non-inverting input terminal, and an output terminal. The second amplifying circuit 251a may sense a electric flow between the first output node N3 and the second output node N4. That is, the second amplifying circuit 251a may be operated by a current detecting element or a voltage measuring element.

Any one of the first output node N3 and the second output node N4 may be electrically connected to any one of the input terminals of the second amplifying circuit 251a, and the other one of the first output node N3 and the second output node N4 may be electrically connected to the other input terminal of the second amplifying circuit 251a. For example, the first output node N3 may be connected to the inverting input terminal of the second amplifying circuit 251a, and the second output node N4 may be connected to the non-inverting input terminal of the second amplifying circuit 251a.

The output terminal of the second amplifying circuit 251a may output a first voltage Va proportional to a difference between the voltage values input to the both input terminals.

In some exemplary embodiments, the product of the resistance value Ra of the strain gauge 150 and the resistance value R1 of the first resistor WBa in the state where the touch input is not applied may be substantially the same as the product of the resistance values Rta1 and Rta2 of the temperature compensation patterns 160a and 160b.

When a touch input occurs, the resistance value Ra of the strain gauge 150 includes a component that changes in shape depending on a touch pressure (hereinafter, referred to as a 'first pressure resistance component') and a component that changes based on a temperature change (hereinafter, referred to as 'first temperature resistance component'). Further, when the touch input occurs, the resistance values Rta1 and Rta1 of the temperature compensation patterns 160a and 160b include a component that changes in shape depending on a touch pressure (hereinafter referred to as a 'second pressure resistance component') and a component that changes based on a temperature change (hereinafter, referred to as 'second temperature resistance component'). The second pressure resistance component may be negligible, or may exhibit a significant difference from the first pressure resistance component. Since the strain gauge 150 and the temperature compensation patterns 160a and 160b are not arranged to face each other in a diagonal direction in the Wheatstone Bridge circuit, the second temperature resistance component of the temperature compensation patterns 160a, 160b may compensate or offset the first temperature resistance component of the strain gage 150, and thus the touch pressure may be detected more sensitively. However, the circuit connected to the strain gage 150 and the temperature compensation patterns 160a and 160b is not limited thereto, and in some exemplary embodiments, the resistance value Ra of the strain gage 150 and the resistance value Rta of the temperature compensation pattern 160 may be connected to one output node as shown in FIG. 23, and the electric flow between the resistance value Ra of the strain gage 150 and the resistance value Rta of the temperature compensation pattern 160 may be detected through the second amplifying circuit 251a. Illustratively, a driving voltage VS may be applied to one end of the strain gauge 150, and the other end of the strain gauge 150 may be connected to the output node N. One end of the temperature compensation pattern 160 may be connected to the ground GND, and the other end of the temperature compensation pattern 160 may be connected to the output node N. The output node N between the resistance value Ra of the strain gage 150 and the resistance value Rta of the temperature compensation pattern 160 may be connected to the non-inverting input terminal of the second amplifying circuit 251a, the inverting input terminal of the second amplifying circuit 251a may be connected to the ground GND, and the output terminal of the second amplifying circuit 251a may output the first voltage Va proportional to the difference between the voltage values input to the both input terminals.

Figure 28:
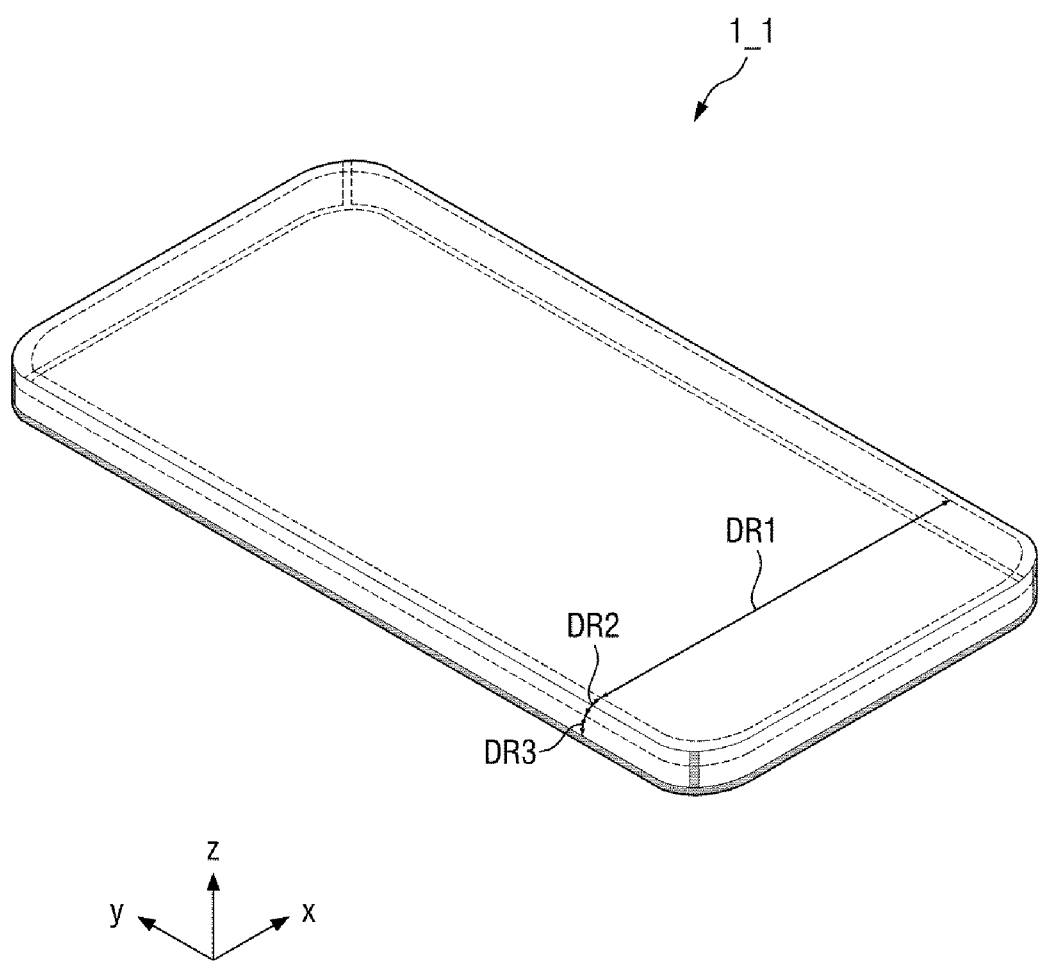
FIG. 28 is a perspective view of a display device according to another exemplary embodiment.
Figure 29:
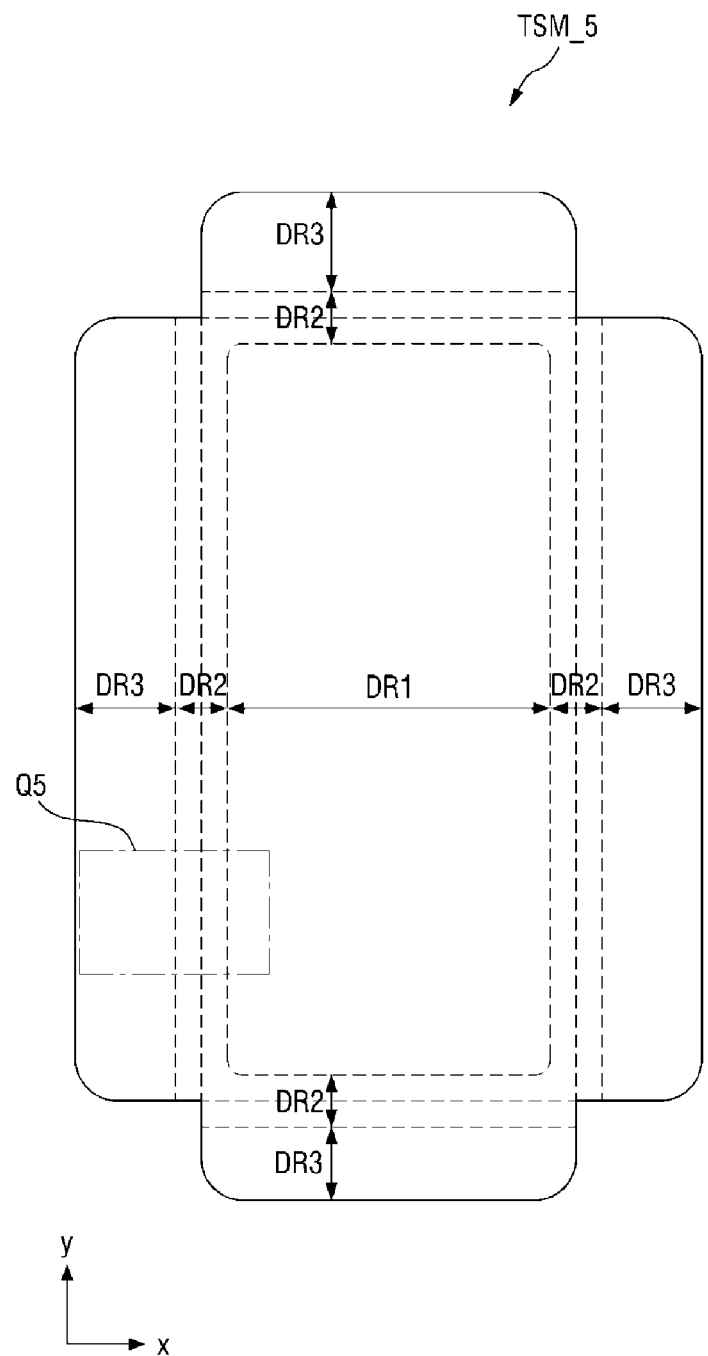
FIG. 29 is a view schematically showing the shape of a touch sensor according to another exemplary embodiment.
Figure 30:
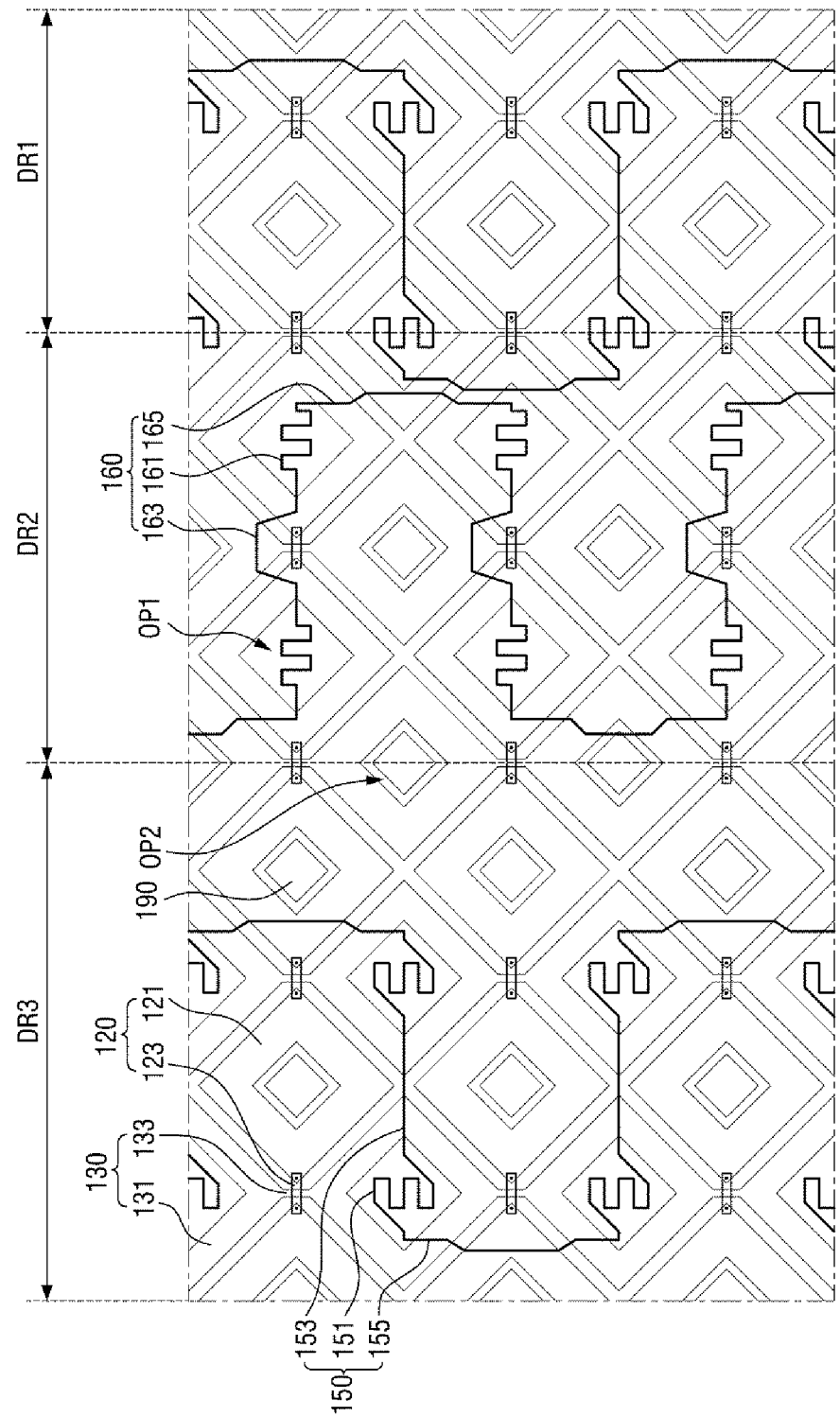
FIG. 30 is an enlarged plan view of the portion Q5 of FIG. 29.
Figure 31:
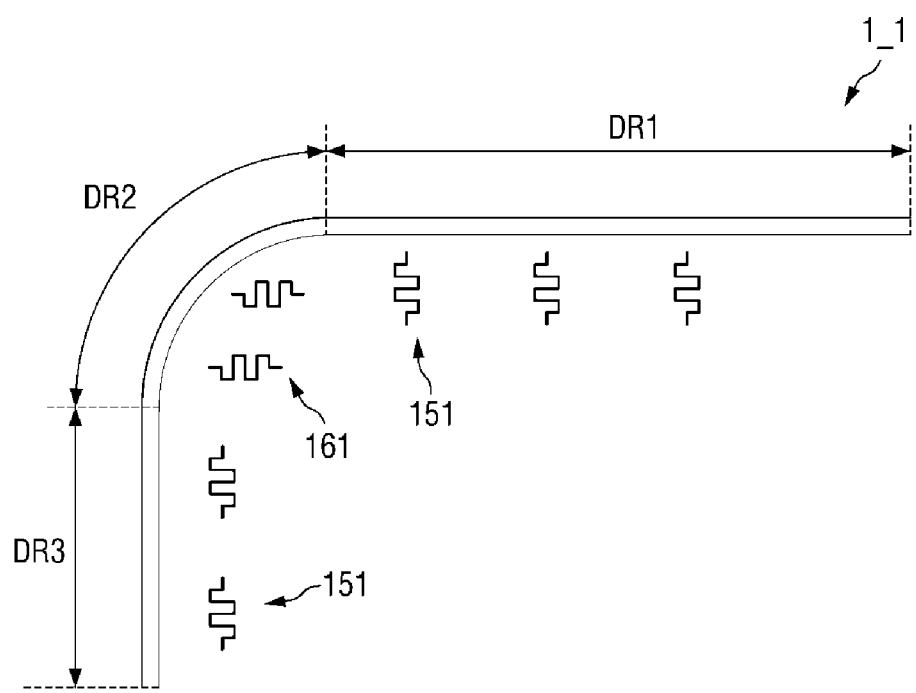
FIG. 31 is a view for explaining the arrangement of a strain gauge and a temperature compensation pattern in the display device according to another exemplary embodiment.

FIG. 28 is a perspective view of a display device according to another exemplary embodiment, FIG. 29 is a view schematically showing the shape of a touch sensor according to another exemplary embodiment, FIG. 30 is an enlarged plan view of the portion Q5 of FIG. 29, and FIG. 31 is a view for explaining the arrangement of a strain gauge and a temperature compensation pattern in the display device according to another exemplary embodiment. The exemplary embodiment of FIGS. 28 to 31 is different from the exemplary embodiment of FIGS. 1 to 27 in that it further includes a side region extending from the curved portion. A description overlapping the exemplary embodiment of FIGS. 1 to 27 will be omitted, and differences will be mainly described.

Referring to FIG. 28, a display device 1_1 may include a first region DR1 which is a flat portion, a second region DR2 which is a curved portion extending from the first region DR1, and a third region DR3 which is a side region extending from the second region DR2.

Although it is illustrated in FIG. 28 that the second region DR2 and the third region DR3 extend from the upper, lower, left and right sides of the first region DR1, the present invention is not limited thereto. That is, the second region DR2 and the third region DR3 extend from only one side of the upper, lower, left and right sides of the first region DR1. Hereinafter, a case where the second region DR2 and the third region DR3 extend from the upper, lower, left and right sides of the first region DR1 will be mainly described.

Referring to FIG. 29, a touch sensor TSM_1 may include a first region DR1 which is a flat portion, a second region DR2 which is a curve region extending from the first region DR1, and a third region which is a side region extending from the second region DR2. Illustratively, the second region DR2 as a curved portion and the third region DR3 as a side region may have the same length as the first region DR1 in the second direction (Y-axis direction), and may extend from the first region DR in the first direction (X-axis direction) and in a direction opposite to the first direction (X-axis direction), respectively. Further, the second region DR2 as a curved portion and the third region DR3 as a side region may have the same length as the first region DR1 in the first direction (X-axis direction), and may extend from the first region DR in the second direction (Y-axis direction) and in a direction opposite to the second direction (Y-axis direction), respectively.

Referring to FIGS. 30 and 31, the strain gauge 150 may be disposed at the boundary between the first region DR1 as a flat portion and the second region DR2 as a curved portion. However, the present invention is not limited thereto. In some exemplary embodiments, the strain gage 150 may be disposed only in the first region DR1 which is a flat portion, and the dummy electrode 190 may be disposed at the boundary between the first region DR1 as a flat portion and the second region DR2 as a curved portion. Further, in some exemplary embodiments, the strain gage 150 may be disposed only in the first region DR1 which is a flat portion, and the temperature compensation pattern 160 may be disposed at the boundary between the first region DR1 as a flat portion and the second region DR2 as a curved portion.

The strain gage 150 may be disposed in the third region DR3 which is a side region. The third region DR3, which is a flat portion, may be formed as a flat surface disposed in a direction perpendicular to the first region DR1. Further, the dummy electrode 190 may be disposed at the boundary between the third region DR3 as a side region and the second region DR2 as a curved portion. However, the present invention is not limited thereto. In some exemplary embodiments, the strain gage 150 may be disposed in the third region DR3 as a side region and at the boundary between the third region DR3 as a side region and the second region DR2 as a curved portion. Further, in some exemplary embodiments, the strain gage 150 may be disposed only in the third region DR3 which is a side region, and the temperature compensation pattern 160 may be disposed at the boundary between the third region DR3 as a side region and the second region DR2 as a curved portion.

The temperature compensation pattern 160 may be disposed in the second region DR which is a curve region between the first region DR1 as a flat portion and the third region DR3 as a side region. The temperature compensation pattern 160 may be disposed over the entire second region DR2, but the present invention is not limited thereto, and the temperature compensation pattern 160 may be disposed only in a part of the second region DR2. Illustratively, the strain gauge 150 may be disposed in a part of the second region DR2. Since the configuration and connection relationship of the strain gauge 150 and the temperature compensation pattern 160 have already been described above, a redundant description will be omitted.

Since the second region DR2, which is a curved portion, is less deformed by pressure than the first region DR1 as a flat portion and the third region DR3 as a side region, the first resistance lines 151 of the strain gauge 150 for pressure sensing are arranged in the first region DR1 and third region DR3 relatively greatly deformed by pressure, and the second resistance lines 161 of the temperature compensation pattern 160 are arranged in the second region DR2 relatively slightly deformed by pressure, thereby more accurately compensating the change in resistance value caused based on the temperature change. Therefore, the touch sensor TSM_5 may more accurately sense the pressure.

As described above, according to exemplary embodiments of the present invention, a touch sensor capable of sensing the pressure of a touch input as well as the position of a touch input and a display device including the touch sensor can be provided.

Further, a touch sensor capable of sensing pressure more precisely through temperature compensation and a display device including the touch sensor can be provided.

The effects of the present invention are not limited by the foregoing, and other various effects are anticipated herein.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A touch sensor, comprising:
a base layer including a first region which is a flat portion extending in a first direction and a second direction crossing the first direction, and a second region which is a curved portion extending from the first region in the first direction;
touch electrodes arranged on the base layer and each including an opening;
a strain gauge disposed in the first region; and
a temperature compensation pattern disposed in the second region, wherein:
the touch electrodes include first touch electrodes arranged along a first direction and second touch electrodes arranged along a second direction crossing the first direction, and
the opening includes a first opening disposed in each of the first touch electrodes and a second opening disposed in each of the second touch electrodes;
the strain gauge includes first resistance lines, and the first resistance lines are located in the second opening located in the first region; and
the temperature compensation pattern includes second resistance lines, and the second resistance lines are located in the first opening located in the second region.

2. The touch sensor of claim 1,
wherein the strain gauge further includes a first connection line electrically connecting the first resistance lines in the first direction.

3. The touch sensor of claim 2,
wherein the strain gauge further includes a first connection pattern electrically connecting the first resistance lines electrically connected in the first direction through the first connection line and located in a first row with the first resistance lines electrically connected in the first direction through the first connection line and located in a second row in a second direction.

4. The touch sensor of claim 3,
wherein the temperature compensation pattern further includes a second connection line electrically connecting the second resistance lines in the first direction.

5. The touch sensor of claim 4,
wherein the temperature compensation pattern further includes a second connection pattern electrically connecting the second resistance lines electrically connected in the first direction through the second connection line and located in a first electrode row with the second resistance lines electrically connected in the first direction through the second connection line and located in a second electrode row in a second direction.

6. The touch sensor of claim 5,
wherein the first touch electrodes, the second touch electrodes, the first resistance lines, and the second resistance lines are arranged on the same first layer, and
the first touch electrodes, the second touch electrodes, the first resistance lines, and the second resistance lines are made of the same material.

7. The touch sensor of claim 6, further comprising:
an insulating layer located on the base layer,
wherein the first connection line, the first connection pattern, the second connection line, and the second connection pattern are located on the base layer,
the insulating layer is located on the first connection line, the first connection pattern, the second connection line, and the second connection pattern, and
the first touch electrodes, the second touch electrodes, the first resistance lines, and the second resistance lines are located on the insulating layer.

8. The touch sensor of claim 7, further comprising:
a first connection portion electrically connecting the first touch electrodes in the first direction; and
a second connection portion electrically connecting the second touch electrodes in the second direction,
wherein the first connection portion is located between the base layer and the insulating layer, and
the second connection portion is located on the insulating layer.

9. A touch sensor, comprising:
a base layer including a first region which is a flat portion extending in a first direction and a second direction crossing the first direction, and a second region which is a curved portion extending from the first region in the first direction;
touch electrodes arranged on the base layer and each including an opening;
a strain gauge disposed in the first region;
a temperature compensation pattern disposed in the second region; and
a touch control unit connected to the first touch electrodes, the second touch electrodes, the strain gauge, and the temperature compensation pattern,
wherein:
the touch electrodes include first touch electrodes arranged along a first direction and second touch electrodes arranged along a second direction crossing the first direction;
the opening includes a first opening disposed in each of the first touch electrodes and a second opening disposed in each of the second touch electrodes; and
the touch control unit is configured to detect a position of a touch input based on a change in capacitance between the first touch electrodes and the second touch electrodes, the change being generated in response to the touch input, to detect a pressure of the touch input based on a change in resistance value of the strain gauge, the change being generated in response to the touch input, and to compensate a component duet to a temperature change in the change in resistance value of the strain gauge based on a resistance value of the temperature compensation pattern.

10. The touch sensor of claim 9, further comprising:
a Wheatstone Bridge circuit electrically connected to the strain gauge and the temperature compensation pattern.

11. A touch sensor, comprising:
a base layer including a first region which is a flat portion, a second region which is a curved portion extending from the first region, and a third region which is a side region extending from the second region;
touch electrodes arranged on the base layer and each including an opening;
a strain gauge disposed in each of the first region and the third region; and
a temperature compensation pattern disposed in the second region,
wherein:
the third region is a plane perpendicular to the first region;
the touch electrodes include first touch electrodes arranged along a first direction and second touch electrodes arranged along a second direction crossing the first direction;
the opening includes a first opening disposed in each of the first touch electrodes and a second opening disposed in each of the second touch electrodes;
the strain gauge includes first resistance lines, and the first resistance lines are located in the second opening located in the first region and the third region; and
the temperature compensation pattern includes second resistance lines, and the second resistance lines are located in the first opening located in the second region.

12. The touch sensor of claim 11, further comprising:
a dummy electrode located in the first opening located in the first region and the third region and the second opening located in the second region.

* * * * *